United States Patent
Sekiguchi et al.

(10) Patent No.: US 10,868,340 B2
(45) Date of Patent: Dec. 15, 2020

(54) SECONDARY BATTERY, BATTERY PACK, VEHICLE, AND STATIONARY POWER SUPPLY

(71) Applicant: KABUSHIKI KAISHA TOSHIBA, Minato-ku (JP)

(72) Inventors: Yumiko Sekiguchi, Kawasaki (JP); Hayato Seki, Saitama (JP); Shinsuke Matsuno, Tokyo (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 97 days.

(21) Appl. No.: 16/299,953

(22) Filed: Mar. 12, 2019

(65) Prior Publication Data
US 2019/0296400 A1 Sep. 26, 2019

(30) Foreign Application Priority Data

Mar. 23, 2018 (JP) ................................ 2018-056313
Aug. 31, 2018 (JP) ................................ 2018-162804
Feb. 20, 2019 (JP) ................................ 2019-028342

(51) Int. Cl.
*H01M 10/26* (2006.01)
*B60L 50/64* (2019.01)
*H01M 4/38* (2006.01)
*H01M 4/66* (2006.01)
*H01M 10/42* (2006.01)
*H01M 10/24* (2006.01)
(Continued)

(52) U.S. Cl.
CPC ............. *H01M 10/26* (2013.01); *B60L 50/64* (2019.02); *H01M 4/24* (2013.01); *H01M 4/38* (2013.01); *H01M 4/485* (2013.01); *H01M 4/661* (2013.01); *H01M 10/24* (2013.01); *H01M 10/425* (2013.01); *H01M 2010/4271* (2013.01); *H01M 2220/10* (2013.01); *H01M 2220/20* (2013.01); *H01M 2300/0014* (2013.01)

(58) Field of Classification Search
CPC ...... H01M 4/485; H01M 4/661; H01M 10/24; H01M 10/26; H01M 2300/0014; H01M 2220/10; H01M 2220/20; H01M 4/24; H01M 4/38; H01M 10/425; B60L 50/64
See application file for complete search history.

(56) References Cited

U.S. PATENT DOCUMENTS 4,074,028 A   2/1978   Will
5,108,856 A   4/1992   Shuster
(Continued)

FOREIGN PATENT DOCUMENTS

EP   3 220 459 A1   9/2017
JP   H06-223840     8/1994
(Continued)

*Primary Examiner* — Gregg Cantelmo
(74) *Attorney, Agent, or Firm* — Oblon, McClelland, Maier & Neustadt, L.L.P.

(57) ABSTRACT

According to one embodiment, there is provided a secondary battery including a positive electrode, a negative electrode, and an aqueous electrolyte. The negative electrode contains a titanium-containing oxide. The aqueous electrolyte contains a solvent and alkali metal ions or alkaline earth metal ions, the solvent containing water and a water-soluble organic solvent. An interfacial tension of the aqueous electrolyte is 37 mN/m or less.

17 Claims, 10 Drawing Sheets

(51) Int. Cl.
*H01M 4/24* (2006.01)
*H01M 4/485* (2010.01)

(56) References Cited

U.S. PATENT DOCUMENTS

| | | |
|---|---|---|
| 10,079,390 B2 | 9/2018 | Matsuno et al. |
| 2003/0068549 A1 | 4/2003 | Daniel-Ivad et al. |
| 2009/0087742 A1 | 4/2009 | Martinet et al. |
| 2011/0123847 A1 | 5/2011 | Kato et al. |
| 2014/0335396 A1 | 11/2014 | Onizawa et al. |
| 2017/0222272 A1 | 8/2017 | Takami et al. |
| 2017/0271682 A1* | 9/2017 | Matsuno ............ H01M 4/667 |
| 2017/0271717 A1 | 9/2017 | Yamashita et al. |
| 2017/0373351 A1 | 12/2017 | Kawai et al. |
| 2018/0062205 A1* | 3/2018 | Takechi ............ H01M 10/0567 |
| 2018/0083321 A1 | 3/2018 | Hotta et al. |
| 2018/0277899 A1 | 9/2018 | Takami et al. |
| 2019/0088999 A1 | 3/2019 | Sekiguchi |
| 2019/0089011 A1 | 3/2019 | Seki et al. |

FOREIGN PATENT DOCUMENTS

| | | |
|---|---|---|
| JP | 2784151 | 8/1998 |
| JP | 2004-127673 | 4/2004 |
| JP | 2009-110931 | 5/2009 |
| JP | 5573083 | 7/2014 |
| JP | 2017-174809 | 9/2017 |
| JP | 2017-174810 | 9/2017 |
| JP | 2018-045966 | 3/2018 |
| JP | 2018-160342 | 10/2018 |
| JP | 2018-160443 | 10/2018 |
| JP | 2019-57373 A | 4/2019 |
| JP | 2019-57388 A | 4/2019 |
| WO | WO 2010/067493 A1 | 5/2012 |

* cited by examiner

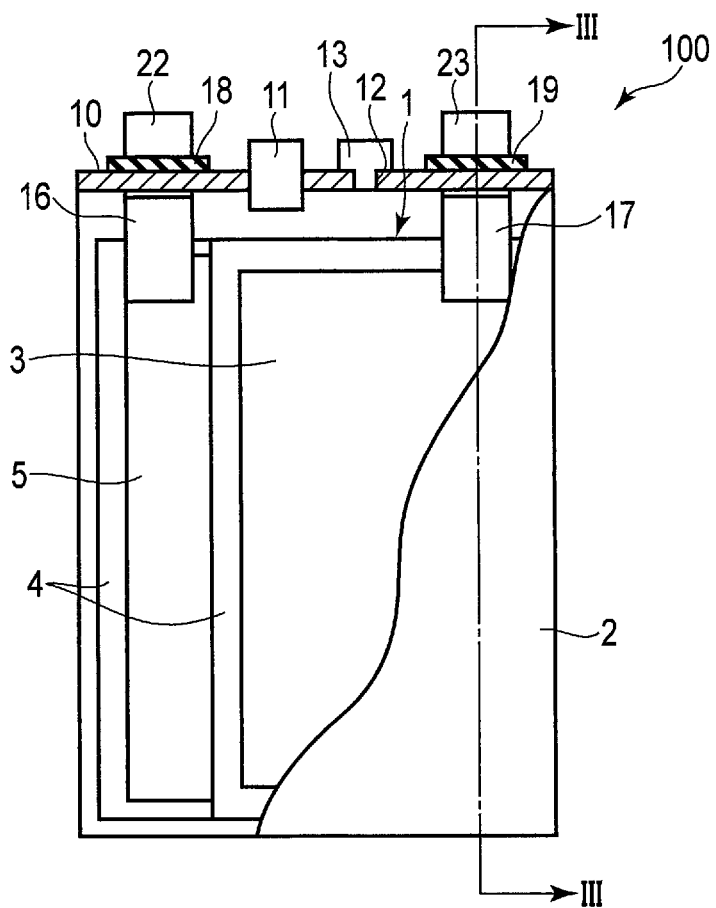
F I G. 1

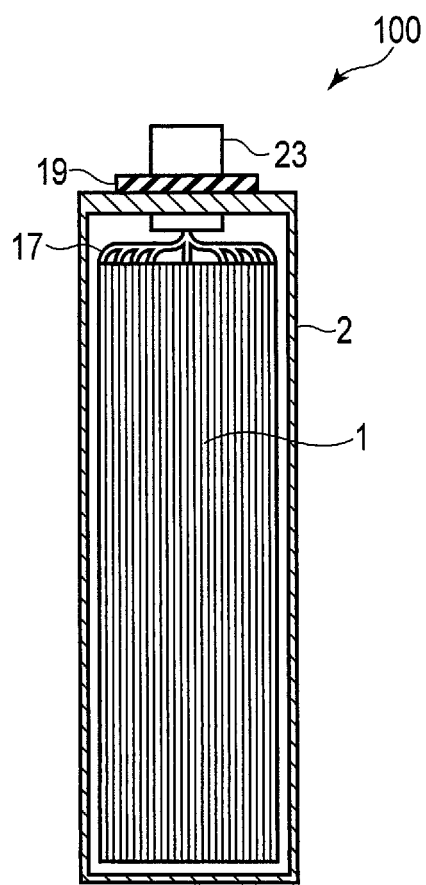
F I G. 2
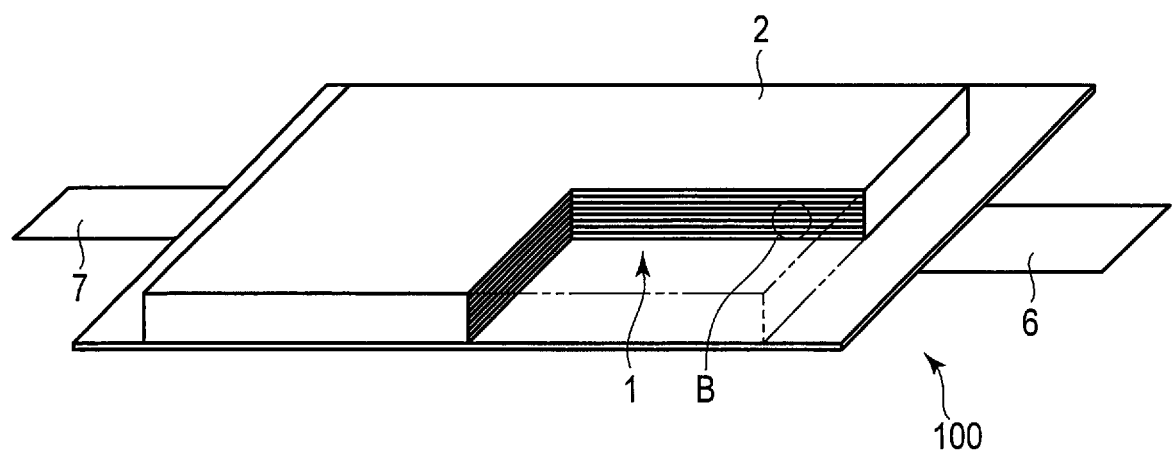
F I G. 3

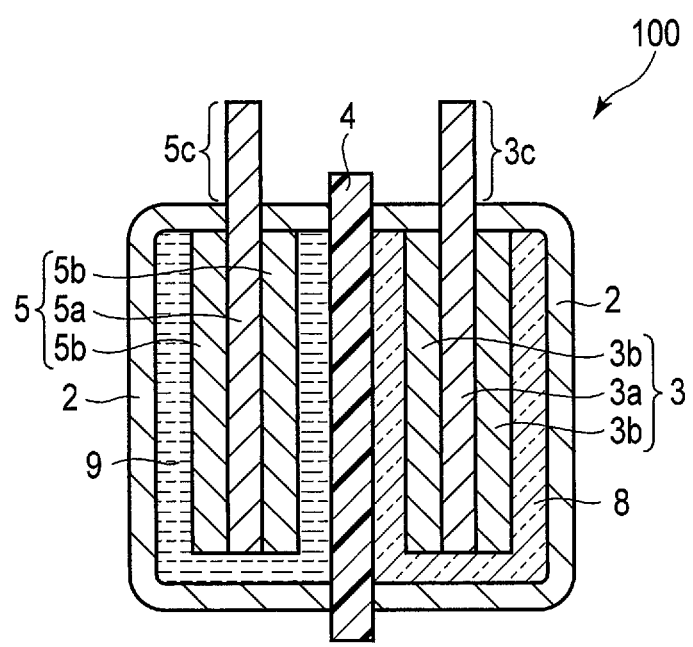
F I G. 5

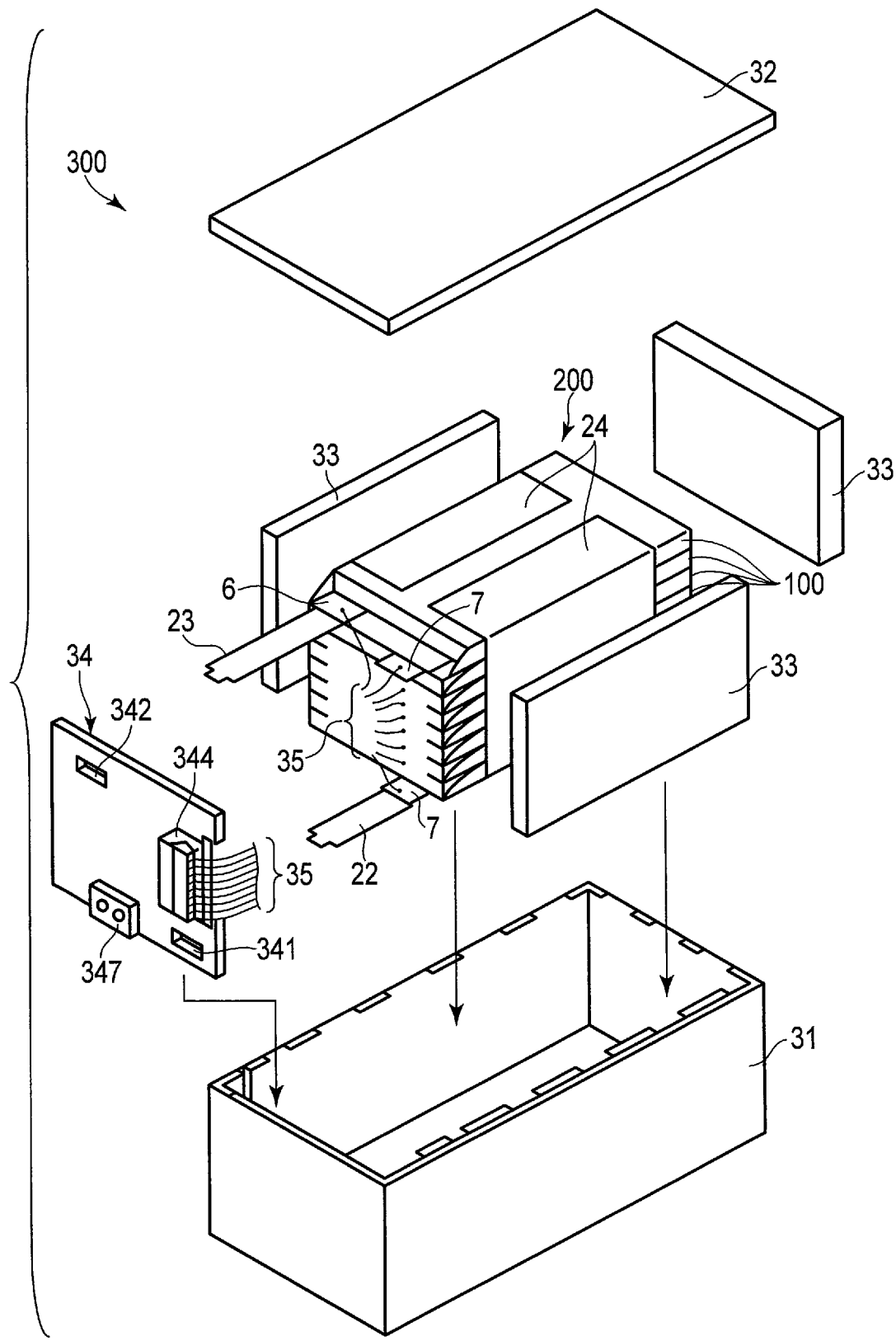
F I G. 7

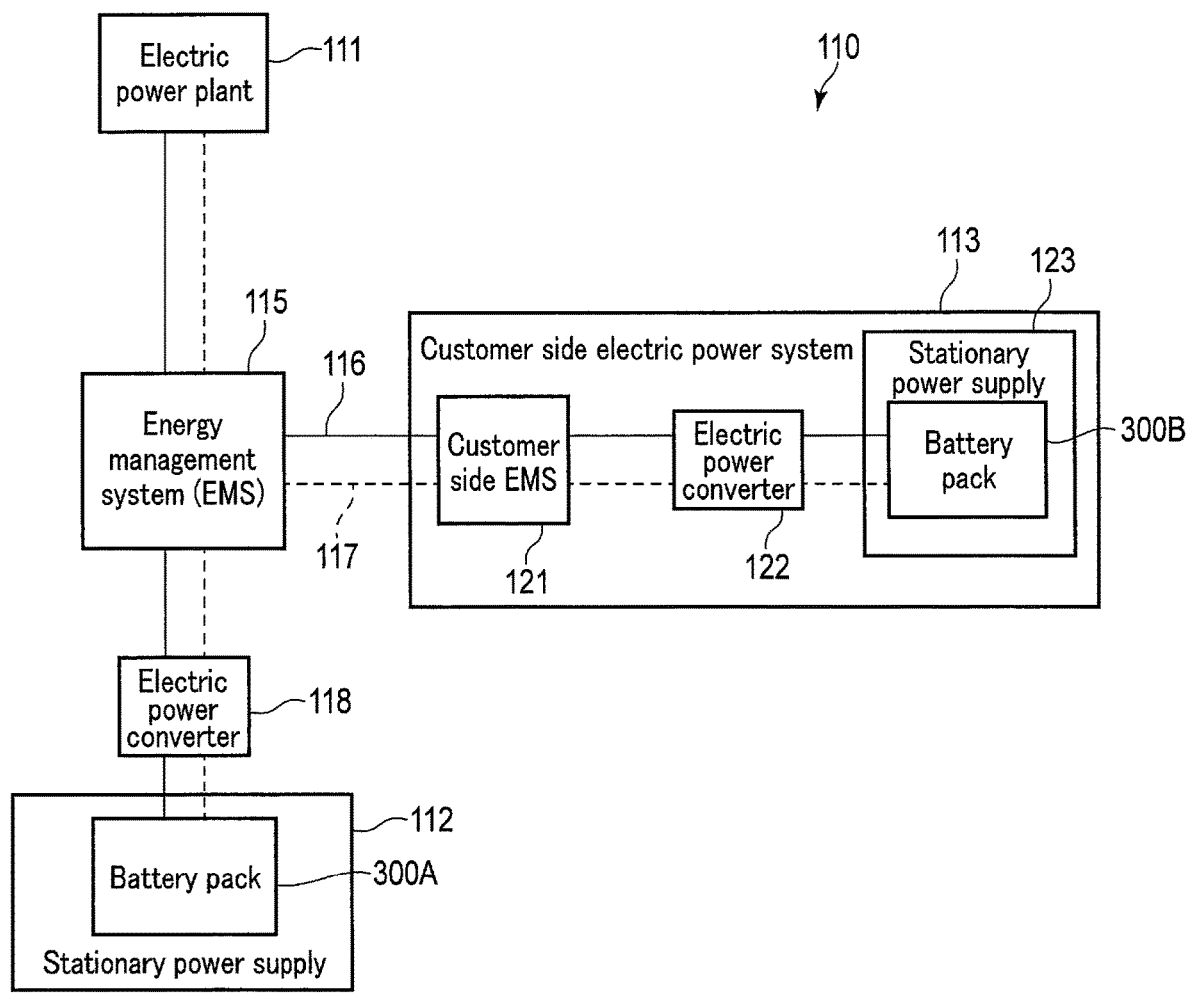
F I G. 10

SECONDARY BATTERY, BATTERY PACK, VEHICLE, AND STATIONARY POWER SUPPLY

CROSS-REFERENCE TO RELATED APPLICATIONS

This application is based upon and claims the benefit of priority from Japanese Patent Application No. 2018-056313, filed Mar. 23, 2018, Japanese Patent Application No. 2018-162804, filed Aug. 31, 2018, and Japanese Patent Application No. 2019-028342, filed Feb. 20, 2019, the entire contents of all of which are incorporated herein by reference.

FIELD

Embodiments described herein relate generally to a secondary battery, a battery pack, a vehicle, and a stationary power supply.

BACKGROUND

A nonaqueous electrolyte battery formed by using a carbon material or a lithium titanium oxide as a negative electrode active material and a layered oxide that contains nickel, cobalt or manganese as a positive electrode active material, particularly a lithium secondary battery has already been in practical use as a power source in a wide range of fields. Such a nonaqueous electrolyte battery is provided in a variety of forms, such as small-sized batteries for various electronic devices and large-sized batteries for electric automobiles. As an electrolytic solution of the lithium secondary battery, a nonaqueous organic solvent prepared by mixing ethylene carbonate, methylethyl carbonate and the like is used, unlike a nickel-hydrogen battery or a lead storage battery. An electrolytic solution prepared using the solvent has a high oxidation resistance and a high reduction resistant property compared to those of an aqueous electrolytic solution, whereby electrolysis of the solvent hardly occurs. Thus, in the case of a nonaqueous lithium secondary battery, a high electromotive force of from 2 V to 4.5 V is attained.

Meanwhile, many organic solvents are flammable substances. Accordingly, the safety of a secondary battery formed by using an organic solvent is theoretically inferior to that of a secondary battery formed by using an aqueous solution. In order to improve the safety of a lithium secondary battery formed by using an electrolytic solution containing an organic solvent, various countermeasures have been made; however, one cannot be certain that the countermeasures are sufficient. Furthermore, in the production process of the nonaqueous lithium secondary battery, a dry environment is necessary, thereby inevitably increasing the production cost. In addition, the electrolytic solution containing an organic solvent is inferior in electrical conductivity, whereby an internal resistance of the nonaqueous lithium secondary battery is easily increased. Such problems are large defects for applying to use in electric vehicles or hybrid electric vehicles and large-sized storage batteries for stationary energy storage, where there is emphasis on the battery safety and cost.

In order to solve these problems, converting from an electrolytic solution to an aqueous solution is under consideration. In the case of the aqueous electrolytic solution, it is necessary that the potential range, in which charge/discharge of a battery is performed, be limited to a potential range which does not causes an electrolysis reaction of water contained as a solvent. The electrolysis of water can be avoided by using, for example, a lithium manganese oxide as the positive electrode active material and a lithium vanadium oxide as the negative electrode active material. Although the combination of these materials results in an electromotive force of from 1 V to 1.5 V, an energy density sufficient as a battery is hardly obtained.

When a lithium manganese oxide is used as the positive electrode active material and a lithium titanium oxide such as $LiTi_2O_4$ or $Li_4Ti_5O_{12}$ is used as the negative electrode active material, an electromotive force of from 2.6 V to 2.7 V can be theoretically obtained. Such a battery may also be attractive from the viewpoint of energy density. A nonaqueous lithium secondary battery formed by using a combination of the positive and negative electrode materials exhibits an excellent life performance. Such a battery has already been in practical use. However, in the aqueous electrolytic solution, the lithium titanium oxide has a lithium insertion/extraction potential of about 1.5 V (vs. $Li/Li^+$) based on lithium potential, whereby electrolysis easily occurs. In particular, in a negative electrode, hydrogen is vigorously generated by electrolysis on the surface of a negative electrode current collector or a metal outer can electrically connected to the negative electrode. Due to an influence thereof, the active material is apt to be easily peeled from the current collector. Consequently, such a battery does not operate stably, whereby it is not possible to perform a satisfactory charge-discharge cycle.

BRIEF DESCRIPTION OF THE DRAWINGS

FIG. 1 is a sectional view schematically showing an example of the secondary battery according to a first embodiment;

FIG. 2 is a sectional view of the secondary battery shown in FIG. 1 taken along a line III-III;

FIG. 3 is a partially cut perspective view schematically showing another example of the secondary battery according to the first embodiment;

FIG. 5 is a sectional view schematically showing yet another example of the secondary battery according to the first embodiment;

FIG. 7 is an exploded perspective view schematically showing an example of the battery pack according to a third embodiment;

FIG. 10 is a block diagram showing an example of a system including the stationary power supply according to a fifth embodiment;

DETAILED DESCRIPTION

Figure 4:
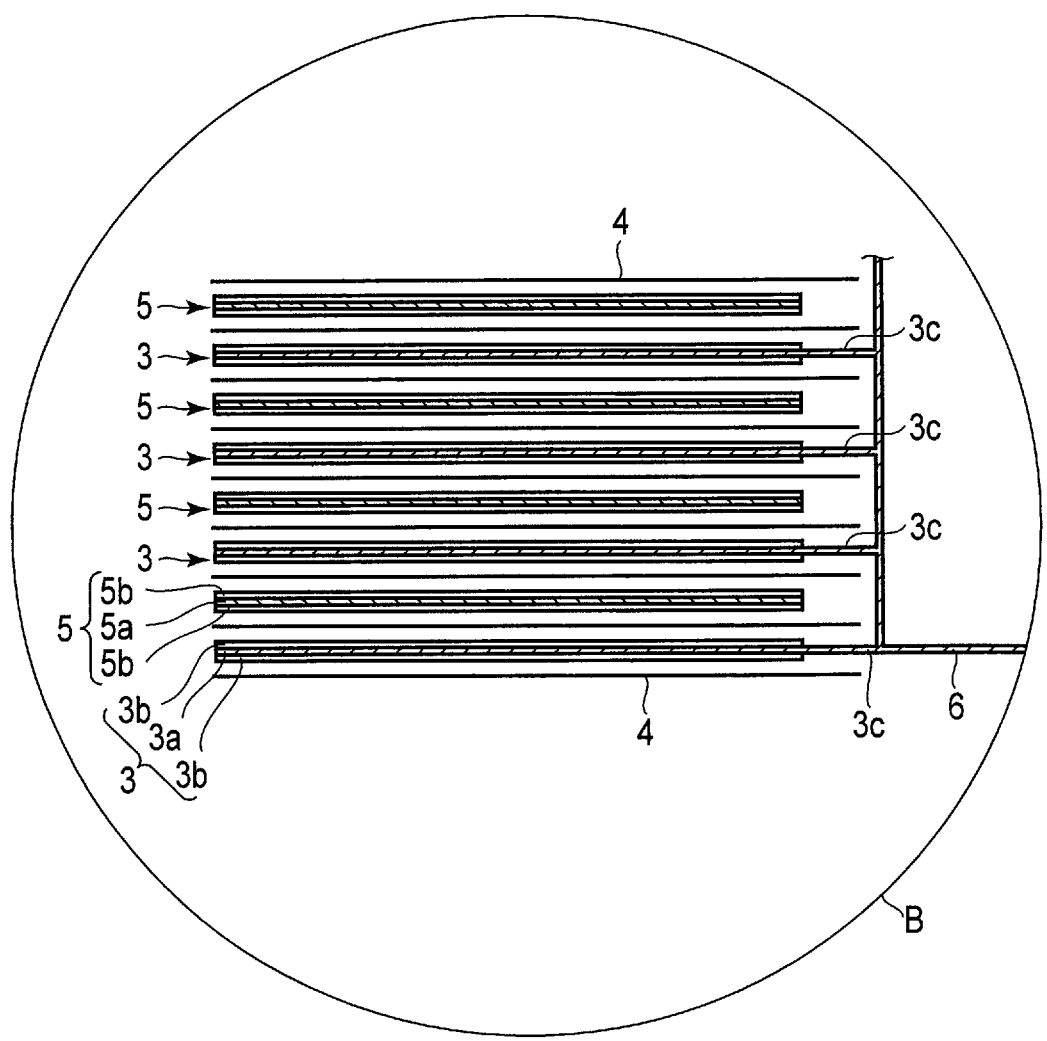
FIG. 4 is an enlarged sectional view showing part B of the secondary battery shown in FIG. 3.

According to one embodiment, there is provided a secondary battery including a positive electrode, a negative electrode, and an aqueous electrolyte. The negative electrode contains a titanium-containing oxide. The aqueous electrolyte contains a solvent and alkali metal ions or alkaline earth metal ions, the solvent containing water and a water-soluble organic solvent. An interfacial tension of the aqueous electrolyte is 37 mN/m or less.

According to another embodiment, a battery pack including the secondary battery according to the above embodiment is provided.

According to still another embodiment, a vehicle including the battery pack according to the above embodiment is provided.

According to still another embodiment, a stationary power supply including the battery pack according to the above embodiment is provided.

Embodiments are explained below, referring to drawings. The same number is applied to common structures throughout the following embodiments, and overlapped explanations are omitted. In addition, each drawing is a schematic view for encouraging explanations of the embodiment and understanding thereof, and thus there are some details in which a shape, a size and a ratio are different from those in a device actually used, but they can be appropriately design-changed considering the following explanations and known technology.

First Embodiment

According to a first embodiment, a secondary battery is provided. The secondary battery includes a positive electrode, a negative electrode, and an aqueous electrolyte. The negative electrode contains a titanium-containing oxide. The aqueous electrolyte contains a solvent and alkali metal ions or alkaline earth metal ions, the solvent containing water and a water-soluble organic solvent. An interfacial tension of the aqueous electrolyte is 37 mN/m or less.

Many titanium-containing oxides including spinel-type lithium titanium oxide $Li_4Ti_5O_{12}$ (LTO) have lower operating potentials than the electrolysis potential of water. Thus, for example, in a secondary battery using a titanium-containing oxide such as LTO as a negative electrode active material and containing a large amount of water in an electrolytic solution, not only does the negative electrode active material become peeled off by bubbles of hydrogen generated by electrolysis of water, but also, an insertion reaction of carriers (for example, alkali metal ions such as lithium ions or alkaline earth metal ions such as magnesium ions) into the negative electrode active material and a reduction reaction of protons (hydrogen cation; $H^+$) by electrolysis of water compete. As a result, the charge-discharge discharge efficiency and the discharge capacity of the secondary battery deteriorate.

In the present embodiment, the aqueous electrolyte contains a solvent and alkali metal ions or alkaline earth metal ions, where the solvent contains water and a water-soluble organic solvent, and the aqueous electrolyte has interfacial tension of 37 mN/m or less. The interfacial tension of the aqueous electrolyte may be 34 mN/m or less. By using such an aqueous electrolyte, battery performance such as the charge-discharge efficiency of the secondary battery can be improved. In addition, a secondary battery exhibiting excellent cycle life performance can be obtained.

The water contained in the aqueous electrolyte may be, for example, pure water.

Alkali metal ions and alkaline earth metal ions are cations derived from electrolyte salts. Details of alkali metal ions, alkaline earth metal ions, and electrolyte salts will be described later.

As the water-soluble organic solvent contained in the aqueous electrolyte, at least one solvent selected from a group consisting of, for example, N-methyl-2-pyrrolidone (NMP), methanol, ethanol, propanol, isopropanol, butanol, isobutyl alcohol, sec-butyl alcohol, tert-butanol, ethylene glycol, 1,2-dimethoxyethane, tetrahydrofuran (THF), 1,4-dioxane, acetone, ethyl methyl ketone, acetonitrile (AN), dimethylformamide, hexamethylphosphoric triamide, triethylamine, pyridine, and dimethyl sulfoxide may be used.

As described later, the positive electrode and the negative electrode may contain a binder. Compounds that may be used as a binder include those that are not compatible with the above-mentioned water-soluble organic solvents. Therefore, precaution is taken with regard to a binder used for an electrode (a positive electrode or a negative electrode) that may come in contact with an aqueous electrolyte containing a water-soluble organic solvent.

The aqueous electrolyte is preferably neutral to basic. In other words, the pH of the aqueous electrolyte is preferably 7 or more. The aqueous electrolyte may be a pH-adjusted solution that has been adjusted by adding a basic compound such as LiOH.

An aqueous electrolyte having interfacial tension of 37 mN/m or less has a high affinity for an electrode (a negative electrode or a positive electrode). The interfacial tension of the aqueous electrolyte can be measured by, for example, the hanging-drop method (pendant drop method) described below.

The interfacial tension of the aqueous electrolyte is influenced by, for example, the concentration of the electrolyte salt contained in the aqueous electrolyte, the pH of the aqueous electrolyte, and the kind and amount of the water-soluble organic solvent contained in the aqueous electrolyte.

For example, in an aqueous electrolyte having an electrolyte salt concentration of 12 mol/L, is basic, and where an organic solvent content is 10 vol %, the interfacial tension may be 50 mN/m or less. With increasing content of the water-soluble organic solvent such as NMP, the interfacial tension of the aqueous electrolyte decreases. Also, as the aqueous electrolyte becomes more basic (as the pH increases), the interfacial tension decreases. On the other hand, with the increasing concentration of the electrolyte salt, the interfacial tension increases.

In addition, the aqueous electrolyte may include a first compound including a surfactant. As the first compound, for example, an organic compound including a hydrophilic portion and a hydrophobic portion in one molecule can be used. Specific examples of the hydrophilic portion include an oxyethylene group. Specific examples of the hydrophobic portion include an alkyl group and an oxyalkylene group.

The alkyl group is, for example, hydrocarbon having 8 to 16 carbon atoms. The alkyl group may be linear or branched. A portion of the hydrogen atoms included in the alkyl group may be substituted with a Group 17 element such as fluorine. The ratio of the number of hydrogen atoms that may be substituted to the number of hydrogen atoms included in the hydrophobic group is in the range of, for example, 10% to 100%.

In an organic electrolytic solution (nonaqueous) lithium ion secondary battery, too, a surfactant is used as an additive for the purpose of lowering the surface energy of the electrolytic solution to improve the affinity between the electrode and the electrolytic solution or for the purpose of forming a coating film on the electrode surface.

Also in an alkaline battery using zinc or a zinc alloy as a negative electrode active material and an alkaline aqueous solution as an electrolytic solution, a surfactant is used as an organic inhibitor added to suppress a zinc corrosion reaction and gas generation. In one example, corrosion of zinc as a negative electrode active material can be prevented by using a hydrocarbon surfactant such as dipolyoxyethylene alkylamide. On the other hand, the hydrocarbon surfactant exhibits strong interaction with zinc and so, an excessive coating may be formed on the surface of the zinc electrode (an electrode using zinc as the active material). The zinc electrode is inactivated by an excessive coating and as a result, the discharge performance is degraded. As an example of countermeasures, an attempt is made to use, together with a hydrocarbon surfactant, a fluorochemical surfactant like polyoxyethylene fluorinated alkyl ether, which has a small effect on discharge performance although its anticorrosion effect is weak.

In the case of the secondary battery according to the embodiment, by adding the first compound including a surfactant into the aqueous electrolyte, in addition to the effect of improving the affinity between an electrode and an electrolytic solution, the effect of suppressing a water decomposition reaction can be promoted. Therefore, the addition of the first compound improves cycle stability and charge-discharge efficiency of the secondary battery.

The surfactant added to the aqueous electrolyte can be adsorbed, for example, to the electrode surface (the surface of the electrode active material) by the hydrophobic portion. In a secondary battery using a negative electrode containing a titanium-containing oxide, the interaction between the titanium-containing oxide and the surfactant is not too strong, thus an excessive coating film is not formed. The interaction between the hydrophilic portion and a water molecule in a surfactant molecule constrains the water molecule. Thus, the water molecule is inhibited from approaching the surface of the electrode active material (for example, titanium-containing oxide), and the suppression of water electrolysis is promoted.

It is more preferable to use a nonionic surfactant as the first compound. Nonionic surfactants interact with water molecules via hydrogen bonds. Therefore, the nonionic surfactant can better prevent water molecules from approaching the electrode active material.

Specific examples of the nonionic surfactant includes at least one surfactant selected from a group consisting of polyoxyethylene alkyl ether (e.g., $C_{12}H_{25}O(CH_2CH_2O)_nH$; $0.9 \leq n \leq 2.1$) and polyoxyalkylene alkyl ether (e.g., $C_{12}H_{25}O[(CH_2CH(CH_3)O)_m \cdot (CH_2CH_2O)_n]H$; or alternatively, $C_4H_9O(CH_2CH_2O)_n[(CH_2CH(CH_3)O)_m]H$; $0<n\leq35$, $0<m\leq28$). Note that, for example, the range $0.89<n\leq2.1$ is included in the range noted above for subscript n in the chemical formula $C_{12}H_{25}O(CH_2CH_2O)_nH$ for polyoxyethylene alkyl ether. As a specific example of polyoxyethylene alkyl ether represented by chemical formula $C_{12}H_{25}O[(CH_2CH(CH_3)O)_m \cdot (CH_2CH_2O)_n]H$, a compound with subscript n being $1.4 \leq n \leq 35$ and subscript m being $8.4 \leq m \leq 40$ can be cited.

As the first compound, one kind of compound may be used alone. Alternatively, two or more compounds may be used as the first compound. Even when one kind of compound is used alone as the first compound, the above-mentioned effect can be exhibited.

The first compound may contain alcohol that is a raw material of the first compound or polyether polyol as a by-product.

By the addition of the first compound to the aqueous electrolyte, the interfacial tension may change. For example, by adding the first compound, the interfacial tension of the aqueous electrolyte may be lowered. Depending on the kind of the first compound, the degree of change of the interfacial tension varies.

Even if the kind of the surfactant in the aqueous electrolyte is changed or the added amount is increased, it is difficult to reduce the interfacial tension of the aqueous electrolyte to less than about 20 mN/m. Therefore, by setting the interfacial tension of the aqueous electrolyte to 20 mN/m or more, use of the first compound in an excessive amount can be avoided.

The degree of performance improvement of the secondary battery by adding the first compound to the aqueous electrolyte may vary depending on the proportion of the hydrophilic portion that the first compound includes in one molecule. For example, there may be a correlation between the battery performance and an HLB (Hydrophilic-Lipophilic Balance) value of the first compound in the aqueous electrolyte. The HLB value is an index representing the proportion of the hydrophilic portion in the surfactant and can be determined as follows: HLB value=20×[molecular weight of hydrophilic portion/total molecular weight].

As specific examples of the method of calculating the HLB value, explained below are calculations methods when using as the first compound, an example of polyoxyethylene alkyl ether $C_{12}H_{25}O(CH_2CH_2O)_nH$ and two examples of polyoxyalkylene alkyl ether $C_{12}H_{25}O[(CH_2CH(CH_3)O)_m \cdot (CH_2CH_2O)_n]H$ and $C_4H_9O(CH_2CH_2O)_n[(CH_2CH(CH_3)O)_m]H$.

Figure 12:
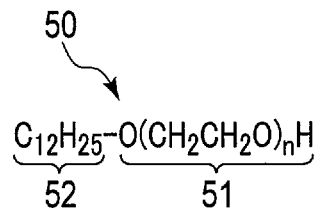
FIG. 12 is a diagram for explaining a calculation method of the HLB (Hydrophilic-Lipophilic Balance) value of polyoxyethylene alkyl ether, using an example chemical formula.

Using the chemical formula of polyoxyethylene alkyl ether shown in FIG. 12, a calculation method of the HLB value of the compound is explained. One end of the polyoxyethylene alkyl ether molecule 50 is taken as the hydrophilic portion 51, and the other end is taken as the hydrophobic portion 52. For example, for a compound represented by chemical formula $C_{12}H_{25}O(CH_2CH_2O)_nH$, taken as the hydrophilic portion 51 is the portion ($-O(CH_2CH_2O)_nH$) including the oxyethylene group and the first oxygen in the chemical formula. The molecular weight of this portion is used as "molecular weight of hydrophilic portion" in the above equation for calculating the HLB value. The alkyl group ($C_{12}H_{25}-$) in the chemical formula is taken as the hydrophobic portion 52. The molecular weight of the entire compound (the whole molecule 50) including the hydrophilic portion 51 and the hydrophobic portion 52 is used as "total molecular weight" in the above equation for calculating the HLB value.

Figure 13:
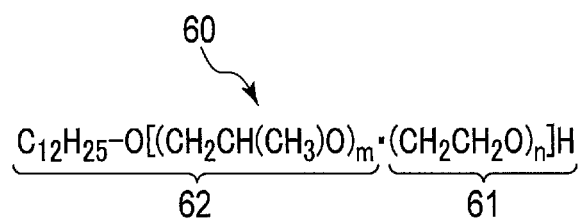
FIG. 13 is a diagram for explaining a calculation method of the HLB value of polyoxyalkylene alkyl ether, using an example chemical formula.

Using the chemical formula of polyoxyalkylene alkyl ether shown in FIG. 13, a calculation method of the HLB value of the compound is explained. One end of the polyoxyalkylene alkyl ether molecule 60 is taken as the hydrophilic portion 61, and the other end is taken as the hydrophobic portion 62. For a compound represented by chemical formula $C_{12}H_{25}O(CH_2CH(CH_3)O)_m \cdot (CH_2CH_2O)_nH$, for example, taken as the hydrophilic portion 61 is an end ($-(CH_2CH_2O)_nH$) including an ethylene oxide unit within the oxyalkylene group ($-[(CH_2CH(CH_3)O)_m \cdot (CH_2CH_2O)_n]H$) in the chemical formula. The molecular weight of this portion is used as "molecular weight of hydrophilic portion" in the above equation for calculating the HLB value. Taken as the hydrophobic portion 62 is an end ($C_{12}H_{25}$—$O(CH_2CH(CH_3)O)_m$—) from the alkyl group ($C_{12}H_{25}$—) to the propylene oxide unit (—$O(CH_2CH(CH_3)O)_m$—) included in the oxyalkylene group in the chemical formula. The molecular weight of the entire compound (the whole molecule 60) including the hydrophilic portion 61 and the hydrophobic portion 62 is used as "total molecular weight" in the above equation for calculating the HLB value.

Figure 14:
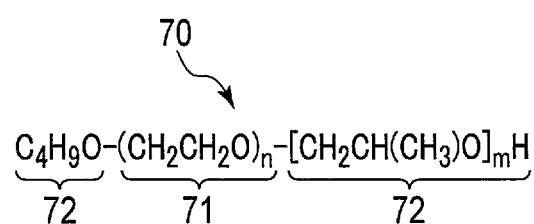
FIG. 14 is a diagram for explaining the calculation method of the HLB value of polyoxyalkylene alkyl ether, using another example chemical formula.

A calculation method of the HLB value of another example of polyoxyethylene alkyl ether is explained with reference to FIG. 14. For polyoxyalkylene alkyl ether represented by chemical formula $C_4H_9O(CH_2CH_2O)_n[CH_2CH(CH_3)O]_mH$, both ends of the molecule 70 are taken as the hydrophobic portion 72, and a portion between these ends is taken as the hydrophilic portion 71. For example, each of the alkyl group ($C_4H_9$—) on one side and the end including the oxypropylene group (—$[CH_2CH(CH_3)O]_mH$) on the other side in the chemical formula is taken as the hydrophobic portion 72. A portion corresponding to the oxyethylene group (—$(CH_2CH_2O)_n$—), which is present therebetween is taken as the hydrophilic portion 71. The molecular weight of the portion corresponding to the hydrophilic portion 71 is used as "molecular weight of hydrophilic portion" in the above equation for calculating the HLB value. The molecular weight of the entire compound (the whole molecule 70) including the hydrophilic portion 71 and the hydrophobic portions 72 is used as "total molecular weight" in the above equation for calculating the HLB value.

The first compound preferably includes one or more nonionic surfactants in which the molecular weight is in the range of 200 to 4000. The molecular weight is more preferably in the range of 400 to 3500, and is even more preferably in the range of 1000 to 3000. The molecular weight described herein can be obtained by a later described method, for example. The molecular weight can also be calculated based on the HLB value, if the HLB value has been determined while the molecular structure of the first compound is known, for example, the subscripts n and m in the above chemical formulae are known. The first compound including a nonionic surfactant with the molecular weight in the preferable ranges described above further improves the battery performance. Reasons for this are described next.

First, as described above, by adding the first compound into the aqueous electrolyte, the affinity between the electrode and the electrolytic solution is improved because of the surfactant effect. In addition, a water decomposition reaction may be suppressed by the surfactant of the first compound being adsorbed onto the electrode surface by the hydrophobic portion to thereby form a coating film, for example.

Because of the adequate molecular weight, the affinity between the electrode and the electrolytic solution does not become too high. From the viewpoint of diminishing the approach of the water molecules to the electrode, it is preferable that the affinity is not too high. Furthermore, the molecular weight has a certain value or more, so that the hydrophobicity of a coating film that may be formed on the electrode surface becomes sufficiently high. This secures the effect by the coating film of inhibiting the water molecule from approaching the electrode. When the molecular weight of the first compound is less than 200, affinity between the electrode and the electrolytic solution is too high. Approaching of water molecules to the electrode becomes easy when the affinity is too high, thereby promoting water decomposition reaction, and therefore not preferable. Furthermore, when the molecular weight is less than 200, the coating film that may form on the electrode surface has low hydrophobicity, whereby inhibiting the approach of water molecules to the electrode becomes difficult.

Since the molecular weight is suppressed to some extent, the hydrophobicity of a coating film that may be formed on the electrode surface does not become too high. Thus, while the approach of water is inhibited, insertion and extraction of carrier ions (for example, lithium ions) into/from the electrode are not prevented. In addition, a compound of smaller molecular weight has a better solubility with respect to the electrolytic solution, thereby making it difficult for the first compound to become deposited outside the solution system. Therefore, there is no concern regarding the prevention of insertion and extraction of carrier ions into/from the electrode due to deposition and accumulation of the first compound on the electrode surface. If the molecular weight of the first compound is greater than 4000, while approaching of water molecules can be inhibited due to the hydrophobicity of the coating film apt to form on the electrode surface being high, insertion and extraction of carrier ions into/from the electrode becomes prevented. In addition, as the solubility of the first compound with respect to the electrolytic solution becomes low when the molecular weight surpasses 4000, the first compound becomes likely to become deposited out from the solution system.

When the molecular weight is within a range of from 400 to 3500, the approach of water can be better inhibited without preventing insertion and extraction of carrier ions into/from the electrode, and therefore more preferable. Furthermore, when the molecular weight is within a range of from 1000 to 3000, the approach of water can be even better inhibited, without preventing insertion and extraction of carrier ions into/from the electrode, and therefore preferable.

It is desirable for the aqueous electrolyte to have high wettability. By using an aqueous electrolyte having high wettability, excellent charge and discharge performance can be obtained. Incidentally, the aqueous electrolyte having high wettability has a low contact angle. For example, the contact angle of the aqueous electrolyte to zinc foil may be 32 deg to 60 deg. Further, for example, the contact angle to the negative electrode using LTO as the negative electrode active material may be 40 deg to 69 deg.

The wettability of the aqueous electrolyte can be controlled by, for example, adding the first compound. For example, by adding the first compound, the contact angle of the aqueous electrolyte to the electrode can be decreased. With an increasing amount of addition of the first compound, the contact angle decreases. In addition, the contact angle decreases as the concentration of the electrolyte salt decreases, and as the content of the water-soluble organic solvent increases.

More preferably, the negative electrode contains zinc. Zinc may be present on the surface of the titanium-containing oxide as zinc metal (elemental zinc) or a compound of zinc (for example, zinc oxide or zinc hydroxide). Also, as the current collector of the negative electrode, a material containing zinc such as zinc foil or a zinc-containing alloy may be used. Zinc present on the surface of the titanium-containing oxide may be, for example, zinc eluted from a zinc-including current collector deposited on the negative electrode at the time of initial charge when the current collector including zinc is used for the negative electrode. Zinc present on the surface of the titanium-containing oxide raises the hydrogen generation overvoltage of the negative electrode. Therefore, an effect of suppressing hydrogen generation is obtained.

When the first compound is added to an aqueous electrolyte, the potential of the electrode surface is made uniform by the first compound being adsorbed onto the electrode. In this case, the deposition of zinc on the electrode surface becomes uniform. As a result, the hydrogen generation overvoltage on the electrode surface can be uniformly raised so that the effect of suppressing hydrogen generation is improved. Therefore, it is preferable to use both the first compound and zinc. For example, a first compound may be used in a weight ratio of 1,000 ppm to 100,000 ppm with respect to zinc in the negative electrode.

[Measurement of Aqueous Electrolyte]

Hereinafter, methods for measuring the properties of an aqueous electrolyte will be described.

When the aqueous electrolyte to be measured is included in, for example, an assembled battery, the aqueous electrolyte is extracted in the manner described below.

The object to be measured is, for example, an aqueous electrolyte contained in unused batteries such as batteries before shipment. A hole is opened in the exterior of a battery, for example, at the bottom of a cylindrical battery, and then the battery is put into a collection container. Batteries in each collection container are introduced into a high-speed centrifuge and a liquid electrolyte is extracted from the inside of the batteries to the collection container by a centrifugal force.

<pH Measuring Method of the Aqueous Electrolyte>

The pH of the aqueous electrolyte can be measured by pH test paper. The measurement of pH is made as described below.

For the measurement, for example, stick-shape pH test paper made by MACHEREY-NAGEL is used. The pH test paper is immersed in the aqueous electrolyte and then lifted. Wait until the color change of the discolored portion is completed. When the discoloration is completed, the finally obtained color is checked against the color guide to determine the pH value.

<Measuring Method of Interfacial Tension of the Aqueous Electrolyte>

The interfacial tension of the aqueous electrolyte can be determined by, for example, a hanging-drop method. As the measuring apparatus, for example, an automatic contact angle meter Dme-201 manufactured by Kyowa Interface Science Co., Ltd. can be used. As the measurement conditions, for example, the conditions shown in the following Table 1 are used.

TABLE 1

| Interfacial tension measurement conditions | |
| --- | --- |
| Measurement interval (ms): | 1000 |
| Number of times: | 21 |
| Fit interval: | 60 |
| End point interval (dot): | 30 |
| Wait time before measurement (ms): | 10000 |
| Algorithm: | Auto |
| Image mode: | Frame |
| Auto threshold level: | Yes |
| Black level (%): | 70 |
| Threshold level: | 128 |
| Image processing area left: | 30 |
| Image processing area top: | 30 |
| Image processing area right: | 30 |
| Image processing area bottom: | 30 |
| Auto droplet adhesion recognition: | Yes |
| Droplet adhesion recognition line (dot): | 50 |
| Curvature correction: | No |
| Curvature radius (μm): | 1000000 |
| Control mode: | Standard |
| Auto droplet creation: | Yes |
| Liquid amount control: | Yes |

TABLE 1-continued

| Interfacial tension measurement conditions | |
| --- | --- |
| Created liquid amount (μL): | 2 |
| Auto droplet adhesion operation: | Yes |
| Auto sample table movement: | Yes |
| Reciprocation: | No |
| Measuring movement interval (mm): | 6 |
| Number of times of repetition: | 10 |

The hanging-drop method is used for the calculation of the interfacial tension, and the interfacial tension of the aqueous electrolyte is calculated from Equation (1) shown below.

$$\text{Interfacial tension (mN/M)} = \Delta\mu g d e^2 (1/H) \quad (1)$$

Each symbol in Equation (1) is as follows:

$\Delta\rho$: Density difference, g: Gravitational acceleration, de: Maximum diameter of the hanging drop, 1/H: Correction coefficient.

For example, measurements are made five times, and the average value thereof is taken as the interfacial tension.

<Measuring Method of Contact Angle of the Aqueous Electrolyte>

The contact angle of the aqueous electrolyte can be determined by, for example, a droplet method.

As the measuring apparatus, for example, an automatic contact angle meter Dme-201 manufactured by Kyowa Interface Science Co., Ltd. can be used. As the measurement conditions, for example, the conditions shown in the following Table 2 are used.

TABLE 2

| Contact angle measurement conditions | |
| --- | --- |
| Measurement interval (ms): | 1000 |
| Number of times: | 21 |
| Analysis technique: | Sessile drop |
| Analysis method: | Standard |
| Three-state system: | No |
| Fit interval designation: | No |
| Fit interval: | 60 |
| End point interval (dot): | 30 |
| Wait time before measurement (ms): | 10000 |
| Algorithm: | Auto |
| Image mode: | Frame |
| Auto threshold level: | Yes |
| Black level (%): | 70 |
| Threshold level: | 128 |
| Image processing area left: | 30 |
| Image processing area top: | 30 |
| Image processing area right: | 30 |
| Image processing area bottom: | 30 |
| Auto droplet adhesion recognition: | Yes |
| Droplet adhesion recognition line (dot): | 50 |
| Curvature correction: | No |
| Curvature radius (μm): | 1000000 |
| Control mode: | Standard |
| Auto droplet creation: | Yes |
| Liquid amount control: | Yes |
| Created liquid amount (μL): | 2 |
| Auto droplet adhesion operation: | Yes |
| Auto sample table movement: | Yes |
| Reciprocation: | No |
| Measuring movement interval (mm): | 6 |
| Number of times of repetition: | 10 |
| Auto liquid sample switching measurement: | 0 |
| Solid sample replacement: | No |
| Liquid amount unit: | μL |
| Permitted range mode: | No |

TABLE 2-continued

Contact angle measurement conditions

| | |
|---|---|
| Permitted range lower limit: | 0 |
| Permitted range upper limit: | 180 |
| Stage control mode: | 1 |

<Measurements of the Water-Soluble Organic Solvent and First Compound>

The identification and quantification of the water-soluble organic solvent and first compound in an aqueous electrolyte can be carried out by the liquid chromatography-mass spectrometry (LC/MS) analysis.

The electrolyte is extracted as described above. By analyzing the extracted electrolyte under the conditions shown in Table 3, components in the electrolyte, for example, the organic solvent and the first compound can be identified and quantified.

TABLE 3

LC/MS measurement conditions

| | |
|---|---|
| Apparatus | HP1100SeriesMSD |
| Column | Develosil-UG-3 |
| Moving phase | $CH_3CN/H_2O$ = 95/5, pH 4 |
| | $CH_3CN/H_2O$ = 80/20, pH 4 |
| Column temp. | 30° C. |
| Flow rate | 0.4 ml/min |
| Interface | ESI |
| Date type | SIM |
| Fragmentor volt | 80 V, 100 V, 200 V |
| Ion mode | Negative |
| | Positive |
| Nebrizer Pressure | 30 psi |
| Nebrizer gas temp. | 350° C. |
| Dry gas flow rate | 10 ml/min |
| Input amount | 20 µl |

<Measurement of Molecular Weight of First Compound>

The molecular weight of the first compound can be measured by the matrix assisted laser desorption/ionization time-of-flight mass spectrometry (MALDI-TOF-MS) analysis. As an apparatus, for example, JMS-S3000 Spiral TOF manufactured by JEOL Ltd. may be used. For data analysis, for example, MS Tornado Analysis manufactured by JEOL Ltd. may be used. For an external standard of a mass configuration, polymethyl methacrylate (molecular weight standards for size-exclusion chromatography) is used.

A value of a position of a peak top in an MALDI-MS spectrum is recorded as the molecular weight.

<Calculation of Polyoxyalkylene Unit Ratios in Nonionic Surfactant>

A ratio of oxyethylene groups and various polyoxyalkylene units included in oxyalkylene groups of a nonionic surfactant can be calculated by the following method based on a proton nuclear magnetic resonance ($^1H$ NMR) spectrometry. As a sample for subjecting to $^1H$ NMR measurement, for example, a liquid electrolyte extracted from a battery can be used as is.

$^1H$ NMR spectrum of the electrolyte is measured. Peaks in the obtained spectrum can be assigned for each alkylene oxide unit according to a chemical shift, a splitting pattern, etc. An integral ratio is calculated with respect to peaks assigned to alkylene oxide units, and based on this value, a ratio of alkylene oxides is obtained. For example, respective peaks that appear in the $^1H$ NMR spectrum obtained by measuring a sample including polyoxyethylene alkyl ether represented by chemical formula $C_{12}H_{25}O[(CH_2CH(CH_3)O)_m \cdot (CH_2CH_2O)_n]H$ include peaks assignable to the alkyl group ($C_{12}H_{25}$—), the propylene oxide unit (—($CH_2CH(CH_3)O$)—), or the ethylene oxide unit (—($CH_2CH_2O$)—). By calculating an integral ratio among the respective assigned peaks, ratio of subscripts n and m can be determined.

A secondary battery according to the embodiment may further include a separator disposed between a positive electrode and a negative electrode. The positive electrode, the negative electrode, and the separator can constitute an electrode group. The aqueous electrolyte may be held by the electrode group. The secondary battery may further include a container member capable of housing the electrode group and the aqueous electrolyte.

Also, the secondary battery may further include a negative electrode terminal electrically connected to the negative electrode and a positive electrode terminal electrically connected to the positive electrode.

Hereinafter, the aqueous electrolyte, the positive electrode, the negative electrode, the separator, the container member, the negative electrode terminal, and the positive electrode terminal will be described in detail.

(1) Aqueous Electrolyte

The aqueous electrolyte contains water and alkali metal ions or alkaline earth metal ions. Also, the aqueous electrolyte contains the water-soluble organic solvent described above. In addition, the aqueous electrolyte may include the first compound described above.

When an appropriate separator is used as described later, it is possible to use different aqueous electrolytes on the positive electrode side and on the negative electrode side within the secondary battery or in the electrode group. The water-soluble organic solvent may be omitted from an aqueous electrolyte that cannot come into contact with the negative electrode (for example, an aqueous electrolyte segregated to the positive electrode side, like a second aqueous electrolyte described below). Further, the interfacial tension of the aqueous electrolyte that cannot come into contact with the negative electrode may exceed 37 mN/m. On the other hand, the aqueous electrolyte that may come into contact with the negative electrode preferably contains a water-soluble organic solvent and has interfacial tension of 37 mN/m or less. In addition, the aqueous electrolyte that comes into contact with the negative electrode (for example, a first aqueous electrolyte described below) preferably has pH of 7 or more.

Alkali metal ions and alkaline earth metal ions are, for example, cations derived from an electrolyte salt. Examples of the alkali metal ions include lithium ions and sodium ions. Examples of the alkaline earth metal ions include magnesium ions and calcium ions. The aqueous electrolyte may contain one of lithium ions, sodium ions, magnesium ions, and calcium ions. Alternatively, the aqueous electrolyte may include two or more kinds of the cations. The aqueous electrolyte preferably contains lithium ions.

Examples of the electrolyte salt include lithium salts, sodium salts, magnesium salts, and calcium salts.

Examples of the lithium salt include LiCl, LiBr, LiOH, $Li_2SO_4$, $LiNO_3$, $LiN(SO_2CF_3)_2$ (LiTFSI: lithium bis(trifluoromethanesulfonyl)imide), $LiN(SO_2F)_2$ (LiFSI: lithium bis(fluorosulfonyl)imide), and $LiB[(OCO)_2]_2$ (LiBOB: lithium bis(oxalate)borate). The kind of lithium salt used may be one kind or may be two or more kinds.

Examples of the sodium salt include NaCl, $Na_2SO_4$, NaOH, $NaNO_3$, NaTFSA (sodium trifluoromethanesulfonylamide), and the like. The kind of sodium salt used may be one kind or may be two or more kinds.

Examples of the magnesium salt include $MgCl_2$, $MgSO_4$, $Mg(NO_3)_2$, $Mg(ClO_4)_2$, and the like. The kind of magnesium salt used may be one kind or may be two or more kinds.

Examples of the calcium salt include $CaCl_2$, $Ca(NO_3)_2$, $Ca(Cl_4)_2$, and the like. The kind of calcium salt used may be one kind or may be two or more kinds.

The aqueous electrolyte may contain an electrolyte salt not containing lithium, sodium, magnesium, or calcium.

The aqueous electrolyte may be a liquid (aqueous electrolytic solution) or a gel in which an aqueous electrolytic solution and a polymer material are combined. Examples of the polymer material include polyvinylidene fluoride (PVdF), polyacrylonitrile (PAN), polyethylene oxide (PEO), and the like. However, some polymeric materials are not compatible with the above-mentioned water-soluble organic solvents. For example, it is difficult to form a gel with a combination of PVdF and NMP. Therefore, pay attention to the combination of the kind of water-soluble organic solvent and the kind of polymer material in the aqueous electrolytic solution.

The content of water (for example, the amount of pure water) in the aqueous electrolyte is preferably 1 mol or more with respect to 1 mol of electrolyte salt, which is the solute. The amount of solvent with respect to 1 mol of electrolyte salt is preferably 3.5 mol or more.

The aqueous electrolyte is prepared, for example, by dissolving an electrolyte salt at a concentration of 6 mol/L to 12 mol/L in a solvent containing water and a water-soluble organic solvent. The molar concentration of the electrolyte salt in the aqueous electrolyte is preferably 9 M or more. In this case, an insertion/extraction reaction of alkali metal ions and alkaline earth metal ions as carrier ions into/from the active material becomes dominant over the electrolysis of water.

If the molar concentration of the electrolyte salt in the aqueous electrolyte is excessively low, charge carriers may run short, or the battery may not operate as a secondary battery because the water decomposition becomes dominant over insertion of alkali metal ions and/or alkaline earth metal ions into the negative electrode.

That the aqueous electrolyte contains water can be examined by GC-MS (Gas Chromatography-Mass Spectrometry). In addition, the salt concentration and the water content in the aqueous electrolyte can be measured by, for example, ICP (Inductively Coupled Plasma) emission spectrometry. The molar concentration (mol/L) can be calculated by measuring a predetermined amount of aqueous electrolyte and calculating the concentration of contained salt. In addition, the number of moles of the solute and the solvent can be calculated by measuring the specific gravity of the aqueous electrolyte.

(2) Negative Electrode

The negative electrode includes a negative electrode current collector and a negative electrode active material-containing layer supported on one side or both sides of the negative electrode current collector, the negative electrode active material-containing layer including an active material, a conductive agent, and a binder.

As the negative electrode current collector, a material that is electrochemically stable at a potential at which alkali metal ions or alkaline earth metal ions are inserted into/extracted from the negative electrode active material is used. For example, the negative electrode current collector is preferably made of zinc, copper, nickel, stainless steel, aluminum, or aluminum alloy containing at least one element selected from a group consisting of magnesium (Mg), titanium (Ti), zinc (Zn), manganese (Mn), iron (Fe), copper (Cu), and silicon (Si). An aluminum alloy foil may contain only one of these elements or two or more elements. The negative electrode current collector may be in other forms such as a porous body or a mesh. The negative electrode current collector more preferably includes Zn.

The thickness of the negative electrode current collector is preferably in the range of 5 μm to 20 μm. A negative electrode current collector having such a thickness can keep the strength of negative electrode and the reduction of weight in balance.

Also, the negative electrode current collector may include a section on the surface not supporting the negative electrode active material-containing layer. The section can serve as a negative electrode current collecting tab.

The negative electrode active material-containing layer is disposed on at least one surface of the negative electrode current collector. For example, the negative electrode active material-containing layer may be disposed on one surface of the negative electrode current collector, or the negative electrode active material-containing layer may be arranged on one face and the reverse face of the negative electrode current collector.

As the negative electrode active material, titanium-containing oxides such as titanium oxide, lithium-titanium oxide, niobium titanium oxide and orthorhombic titanium composite oxide may be used. The Li insertion potential of the titanium-containing oxide is in the range of, for example, 1 V (vs. Li/Li$^+$) to 3 V (vs. Li/Li$^+$). The Li insertion potential of the titanium-containing oxide is preferably in the range of 1.2 V (vs. Li/Li$^+$) to 2.0 V (vs. Li/Li$^+$). The negative electrode active material may include one or more of these titanium-containing oxides.

Examples of the titanium oxide include a titanium oxide having a monoclinic structure, a titanium oxide having a rutile structure, and a titanium oxide having an anatase structure. For the titanium oxide having each of the crystal structures, the composition before charge can be represented as $TiO_2$ and the composition after charge can be represented as $Li_xTiO_2$ (x is $0 \leq x \leq 1$). Further, the structure of the titanium oxide having a monoclinic structure before charge is $TiO_2$(B).

Examples of the lithium titanium oxide include a lithium titanium oxide having a spinel structure (e.g., $Li_{4+x}Ti_5O_{12}$ ($-1 \leq x \leq 3$); and a lithium titanium oxide having a ramsdellite structure (e.g., $Li_{2+x}Ti_3O_7$ ($-1 \leq x \leq 3$), $Li_{1+x}Ti_2O_4$ ($0 \leq x \leq 1$), $Li_{1.1+x}Ti_{1.8}O_4$ ($0 \leq x \leq 1$), $Li_{1.07+x}Ti_{1.86}O_4$ ($0 \leq x \leq 1$), and $Li_xTiO_2$ ($0 < x \leq 1$). The lithium titanium oxide may be a lithium-titanium composite oxide into which a dopant is introduced. As an example of the titanium composite oxide, hollandite titanium composite oxide can be cited.

Examples of the niobium titanium oxide include a niobium titanium oxide represented by $Li_aTiM_bNb_{2\pm\beta}O_{7\pm\sigma}$ ($0 \leq a \leq 5$, $0 \leq b \leq 0.3$, $0 \leq \beta \leq 0.3$, $0 \leq \sigma \leq 0.3$, where M is at least one kind of elements selected from the group consisting of Fe, V, Mo, and Ta).

Orthorhombic titanium-containing composite oxide include, for example, a compound represented by $Li_{2+a}M(I)_{2-b}Ti_{6-c}M(II)_dO_{14+c}$. Here, M(I) is at least one selected from a group consisting of Sr, Ba, Ca, Mg, Na, Cs, Rb, and K. M(II) is at least one selected from a group consisting of Zr, Sn, V, Nb, Ta, Mo, W, Y, Fe, Co, Cr, Mn, Ni, and Al. Each subscript in the compositional formula satisfies: $0 \leq a \leq 6$, $0 b < 2$, $0 \leq c < 6$, $0 \leq d < 6$, and $-0.5 \leq \sigma \leq 0.5$. As a specific example of the orthorhombic titanium-containing composite oxide, $Li_{2+a}Na_2Ti_6O_{14}$ ($0 \leq a \leq 6$) can be cited.

The negative electrode contains a negative electrode active material, for example, in the form of particles. Negative electrode active material particles may be single primary particles, secondary particles which are aggregates of the primary particles, or a mixture of single primary particles and secondary particles. The shape of the particles is not particularly limited, and may be, for example, a spherical shape, an elliptical shape, a flat shape, a fibrous shape, or the like.

A conductive agent is added in order to increase the current-collecting performance and suppress the contact resistance between the active material and the current collector. Examples of the conductive agent include carbonaceous materials such as vapor grown carbon fiber (VGCF), carbon black such as acetylene black, and graphite. One of these materials may be used as the conductive agent, or two or more of these materials may be combined and used as the conductive agent. Alternatively, instead of using the conductive agent, carbon coating or electron conductive inorganic material coating may be performed on the surfaces of the active material particles.

A binder is added in order to fill gaps between dispersed active materials and to bind the active material and the negative electrode current collector. Examples of the binder include polytetrafluoroethylene (PTFE), fluorine rubber, styrene butadiene rubber, polyacrylate compound, imide compound, carboxyl methyl cellulose (CMC), and salts of the CMC. One of these materials may be used as the binder, or two or more of these materials may be combined and used as the binder.

In the compounding ratios of the negative electrode active material, the conductive agent, and binder in the negative electrode active material-containing layer, it is preferable that the negative electrode active material is in the range of 70% by mass to 95% by mass, the conductive agent is in the range of 3% by mass to 20% by mass, and the binder is in the range of 2% by mass to 10% by mass. When the compounding ratio of the conductive agent is 3% by mass or more, current-collecting performance of the negative electrode active material-containing layer can be improved. When the content of the binder is 2% by mass or more, sufficient electrode strength can be obtained, and when the content of the binder is 10% by mass or less, insulating parts of the electrode can be reduced.

The density of the negative electrode active material-containing layer (excluding the current collector) is preferably in the range of 1.8 g/cm³ to 2.8 g/cm³. A negative electrode in which the density of the negative electrode active material-containing layer is within this range is excellent in energy density and the retention of aqueous electrolyte. The density of the negative electrode active material-containing layer is more desirably in the range of 2.1 g/cm³ to 2.6 g/cm³.

The negative electrode can be produced by, for example, the following method. First, a negative electrode active material, a conductive agent, and a binder are suspended in a solvent to prepare a slurry. The slurry is applied to one side or both sides of a negative electrode current collector. Next, the applied slurry is dried to obtain a stacked laminate of the negative electrode active material-containing layer and the negative electrode current collector. Then, the stacked laminate is pressed. In this manner, a negative electrode is produced.

Alternatively, a negative electrode is produced by the following method: First, a negative electrode active material, a conductive agent, and a binder are mixed to obtain a mixture thereof. Next, the mixture is molded into a pellet form. Next, a negative electrode can be obtained by arranging these pellets on the negative electrode current collector.

(3) Positive Electrode

The positive electrode may include a positive electrode current collector and a positive electrode active material-containing layer. The positive electrode active material-containing layer may be formed on one side or both sides of the positive electrode current collector. The positive electrode active material-containing layer may include a positive electrode active material, and optionally a conductive agent and a binder.

The positive electrode current collector is preferably titanium, aluminum, or an aluminum alloy containing one or more elements selected from a group consisting of Mg, Ti, Zn, Ni, Cr, Mn, Fe, Cu, and Si.

The thickness of the positive electrode current collector is preferably in the range of 5 µm to 20 µm, and more preferably 15 µm or less.

Also, the positive electrode current collector may include a section on the surface where no positive electrode active material-containing layer is formed. The section can serve as a positive electrode current collecting tab.

The positive electrode active material-containing layer is disposed on at least one surface of the positive electrode current collector. For example, the positive electrode active material-containing layer may be disposed on one surface of the positive electrode current collector, or the positive electrode active material-containing layer may be arranged on one face and the reverse face of the positive electrode current collector.

As the positive electrode active material, for example, an oxide or sulfide can be used. The positive electrode may contain one kind of compound alone as the positive electrode active material or two or more kinds of compounds in combination. As an example of the oxide or sulfide, a compound capable of having an alkali metal, alkali metal ions, an alkaline earth metal, or alkaline earth metal ions be inserted and extracted.

Examples of such compounds include manganese dioxides ($MnO_2$), iron oxides, copper oxides, nickel oxides, lithium manganese composite oxides (e.g., $Li_xMn_2O_4$ or $Li_xMnO_2$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y}Co_yO_2$; $0<x\leq1$, $0<y<1$), lithium manganese cobalt composite oxides (e.g., $Li_xMn_yCo_{1-y}O_2$; $0<x\leq1$, $0<y<1$), lithium manganese nickel composite oxides having a spinel structure (e.g., $Li_xMn_{2-y}Ni_yO_4$; $0<x\leq1$, $0<y<2$), lithium phosphates having an olivine structure (e.g., $Li_xFePO_4$; $0<x\leq1$, $Li_xFe_{1-y}Mn_yPO_4$; $0<x\leq1$, $0<y<1$, and $Li_xCoPO_4$; $0<x<1$), iron sulfates [$Fe_2(SO_4)_3$], vanadium oxides (e.g., $V_2O_5$), and lithium nickel cobalt manganese composite oxide ($Li_xNi_{1-y-z}Co_yMn_zO_2$; $0<x\leq1$, $0<y<1$, $0<z<1$, $y+z<1$).

Among the above compounds, examples of more desirable compounds as the positive electrode active material include lithium manganese composite oxides having a spinel structure (e.g., $Li_xMn_2O_4$; $0<x\leq1$), lithium nickel composite oxides (e.g., $Li_xNiO_2$; $0<x\leq1$), lithium cobalt composite oxides (e.g., $Li_xCoO_2$; $0<x\leq1$), lithium nickel cobalt composite oxides (e.g., $Li_xNi_{1-y-z}Co_yMn_zO_2$; $0<x\leq1$, $0<y<1$), lithium manganese nickel composite oxides having a spinel structure (e.g., $Li_xMn_yCo_{1-y}O_2$; $0<x\leq1$, $0<y<2$), lithium manganese cobalt composite oxides (e.g., $Li_xMn_yCo_{1-y}O_2$; $0<x\leq1$, $0<y<1$), lithium iron phosphates (e.g., $Li_xFePO_4$; $0<x\leq1$), and lithium nickel cobalt manganese composite oxides ($Li_xNi_{1-y-z}Co_yMn_zO_2$; $0<x\leq1$, $0<y<1$, $0<z<1$, y+z<1). When these compounds are used as the positive electrode active material, the positive electrode potential can be increased.

The primary particle size of the positive electrode active material is preferably from 100 nm to 1 μm. The positive electrode active material having a primary particle size of 100 nm or more is easy to handle during industrial production. In the positive electrode active material having a primary particle size of 1 μm or less, diffusion of alkali metal ions and alkaline earth metal ions within solid can proceed smoothly.

The specific surface area of the positive electrode active material is preferably in the range of 0.1 m²/g to 10 m²/g. A positive electrode active material having the specific surface area of 0.1 m²/g or more can adequately secure insertion/extraction sites of alkali metal ions and alkaline earth metal ions. A positive electrode active material having the specific surface area of 10 m²/g or less is easy to handle in industrial production and also can ensure charge-and-discharge cycle performance.

The binder is added to fill gaps among the dispersed positive electrode active material and also to bind the positive electrode active material with the positive electrode current collector. Examples of the binder include polytetrafluoro ethylene (PTFE), polyvinylidene fluoride (PVdF), flurorubber, polyacrylate compound, imide compound, carboxyl methyl cellulose (CMC), and CMC salt. One of these may be used as the binder or a combination of two or more may be used as the binder.

The conductive agent is added to improve a current collection performance and to suppress the contact resistance between the positive electrode active material and the positive electrode current collector. Examples of the conductive agent include carbonaceous substances such as vapor grown carbon fiber (VGCF), carbon black such as acetylene black, and graphite. One of these may be used as the conductive agent, or two or more may be used in combination as the conductive agent. The conductive agent may be omitted.

In the positive electrode active material-containing layer, the positive electrode active material and binder are preferably blended in proportions of 80% by mass to 98% by mass, and 2% by mass to 20% by mass, respectively.

By setting the amount of the binder to 2% by mass or more, sufficient electrode strength can be obtained. The binder may also function as an electrical insulator. Thus, if the amount of the binder is set to 20% by mass or less, the amount of electrical insulator contained in the electrode decreases, and thereby internal resistance can be decreased.

When a conductive agent is added, the positive electrode active material, the binder, and the conductive agent are preferably blended in proportions of 77% by mass to 95% by mass, 2% by mass to 20% by mass, and 3% by mass to 15% by mass, respectively.

By setting the amount of the conductive agent to 3% by mass or more, the above effect can be expressed. Also, by setting the amount of the conductive agent to 15% by mass or less, the proportion of the conductive agent in contact with the electrolyte can be reduced. When this proportion is low, decomposition of the electrolyte can be reduced during storage under high temperatures.

The positive electrode is produced by, for example, the following method. First, a positive electrode active material, a conductive agent, and a binder are suspended in a solvent to prepare a slurry. The slurry is applied to one side or both sides of a positive electrode current collector. Next, the applied slurry is dried to obtain a stacked laminate of the positive electrode active material-containing layer and the positive electrode current collector. Then, the stacked laminate is pressed. In this manner, a positive electrode is produced.

Alternatively, a positive electrode is produced by the following method: First, a positive electrode active material, a conductive agent, and a binder are mixed to obtain a mixture thereof. Next, the mixture is molded into a pellet form. Next, a positive electrode can be obtained by arranging these pellets on the positive electrode current collector.

(4) Separator

A separator may be disposed between the positive electrode and the negative electrode. The separator is formed from, for example, a porous film containing polyethylene (PE), polypropylene (PP), cellulose, or polyvinylidene fluoride (PVdF), or a synthetic resin nonwoven fabric.

The separator may be an ion exchange membrane or a solid electrolyte. When an ion exchange membrane or a solid electrolyte is used as a separator, two different aqueous electrolytes may be used for the positive electrode side and the negative electrode side respectively. For example, referring to the aqueous electrolyte on the negative electrode side as a first aqueous electrolyte and the aqueous electrolyte on the positive electrode side as a second aqueous electrolyte, the first aqueous electrolyte and the second aqueous electrolyte can be isolated from each other by the ion exchange membrane or the solid electrolyte. That is, by using an appropriate separator, a battery in which only the first aqueous electrolyte is in contact with the negative electrode can be obtained. Similarly, a battery in which only the second aqueous electrolyte is in contact with the positive electrode can be obtained.

The ion exchange membrane is, for example, a cation exchange membrane having monovalent selectivity. When such an ion exchange membrane is used, only alkali metal ions may be selectively permeated through the ion exchange membrane. Other ions contained in the aqueous electrolyte, for example, anion species do not permeate the cation exchange membrane. Examples of the alkali metal ions include lithium ions and/or sodium ions.

Alternatively, the ion exchange membrane is, for example, a cation exchange membrane having divalent selectivity. When such an ion exchange membrane is used, only alkaline earth metal ions may be selectively permeated through the ion exchange membrane. Other ions contained in the aqueous electrolyte, for example, anion species do not permeate the cation exchange membrane. Examples of the alkaline earth metal ions include magnesium ions and/or calcium ions.

The solid electrolyte includes, for example, a compound in which alkali metal ion conductivity is $10^{-10}$ S/cm or more. The compound in which alkali metal ion conductivity is $10^{-10}$ S/cm or more is, for example, at least one compound selected from a group consisting of $Li_2SeP_2S_5$ based glass ceramic of sulfides, an inorganic compound having a perovskite structure, an inorganic compound having a LiSICON structure, an inorganic compound having a NASICON framework (for example, LATP described below), amorphous LIPON, and an inorganic compound having a garnet structure.

The solid electrolyte is preferably oxides such as LATP ($Li_{1+x}Al_xTi_{2-x}(PO_4)_3$; $0.1 \leq x \leq 0.4$) having a NASICON framework, amorphous LIPON ($Li_xPO_yN_z$; $2.6 \leq x \leq 35$, $1.9 \leq y \leq 3.8$, $0.1 \leq z \leq 1.3$) such as $Li_{2.9}PO_{3.3}N_{0.46}$, and a garnet $Li_7La_3Zr_2O_{12}$ (LLZ).

Among these oxides, the solid electrolyte preferably contains an inorganic compound having a garnet structure. An inorganic compound having a garnet structure is preferable because Li ion conductivity and reduction resistance are high, and the electrochemical window is wide. As inorganic compounds having a garnet structure, for example, $Li_{5+x}A_yLa_{3-y}M_2O_{12}$ (A is at least one selected from a group consisting of Ca, Sr, and Ba, whereas M is at least one selected from a group consisting of Nb and Ta), $Li_3M_{2-x}Zr_2O_{12}$ (M is at least one selected from a group consisting of Ta and Nb), $Li_{7-3x}Al_xLa_3Zr_3O_{12}$, and $Li_7La_3Zr_2O_{12}$(LLZ) can be cited. In the above formulas, x is, for example, 0 to 0.8 and preferably 0 to 0.5. y is, for example, 0 to 2. An inorganic compound having a garnet structure may contain one of these compounds, or two compounds or more as a mixture. Among these compounds, since $Li_{6.25}Al_{0.25}La_3Zr_3O_{12}$ and $Li_7La_3Zr_2O_{12}$ have high ionic conductivity and are electrochemically stable, these are excellent in discharge performance and cycle life performance.

(5) Container Member

As the container member that houses the positive electrode, the negative electrode, and the aqueous electrolyte, a metal container, a laminated film container, or a resin container may be used.

As the metal container, a metal can made of nickel, iron, stainless steel, or the like and having a rectangular shape or a cylindrical shape may be used. As the resin container, a container made of polyethylene, polypropylene, or the like may be used.

The board thickness of each of the resin container and the metal container preferably falls within the range of 0.05 mm to 1 mm. The board thickness is more preferably 0.5 mm or less, and even more preferably 0.3 mm or less.

As the laminated film, for example, a multilayered film formed by covering a metal layer with a resin layer may be used. Examples of the metal layer include a stainless steel foil, an aluminum foil, and an aluminum alloy foil. As the resin layer, a polymer such as polypropylene (PP), polyethylene (PE), nylon, or polyethylene terephthalate (PET) may be used. The thickness of the laminated film preferably falls within the range of 0.01 mm to 0.5 mm. The thickness of the laminated film is more preferably 0.2 mm or less.

(6) Negative Electrode Terminal

The negative electrode terminal may be formed, for example, from a material that is electrochemically stable at the potential of alkali metal ions insertion/extraction of the negative active material and has a conductive property. Specifically, the material for the negative electrode terminal may include zinc, copper, nickel, stainless steel, aluminum, or an aluminum alloy containing at least one element selected from a group consisting of Mg, Ti, Zn, Mn, Fe, Cu, and Si. As the material for the negative electrode terminal, zinc or a zinc alloy is preferably used. In order to reduce the contact resistance between the negative electrode terminal and the negative electrode current collector, the negative electrode terminal is preferably made of the same material as that of the negative electrode current collector.

(7) Positive Electrode Terminal

The positive electrode terminal is made, for example, of a material that is electrically stable in a potential range of 3 V to 4.5 V with respect to oxidation-reduction potential of lithium (vs. Li/Li$^+$) and has a conductive property. Examples of the material for the positive electrode terminal include titanium, aluminum, or an aluminum alloy containing at least one element selected from a group consisting of Mg, Ti, Zn, Mn, Fe, Cu, and Si. In order to reduce the contact resistance between the positive electrode terminal and the positive electrode current collector, the positive electrode terminal is preferably made of the same material as that of the positive electrode current collector.

(8) Description of Details of Secondary Battery

The secondary battery according to the embodiment may be used in various forms such as a rectangular shape, a cylindrical shape, a flat form, a thin form, and a coin form. In addition, the secondary battery may be a secondary battery having a bipolar structure. A secondary battery having a bipolar structure has an advantage of being able to produce a cell with in-series connection of multiple, using a single cell.

Details of the secondary battery according to the first embodiment will be described below with reference to FIGS. 1 to 5.

FIG. 1 is a sectional view schematically showing an example of the secondary battery according to the first embodiment. FIG. 2 is a sectional view of the secondary battery shown in FIG. 1 taken along a line III-III.

An electrode group 1 is housed in a rectangular tubular metal container as the container member 2. The electrode group 1 has a structure formed by spirally winding a positive electrode 5 and a negative electrode 3 with a separator 4 interposing therebetween so as to form a flat shape. An aqueous electrolyte (not shown) is held by the electrode group 1. As shown in FIG. 1, a strip-shaped positive electrode tab 16 is electrically connected to each of plural positions at an end of the positive electrode 5 located on an end face of the electrode group 1. In addition, a strip-shaped negative electrode tab 17 is electrically connected to each of plural positions at an end of the negative electrode 3 located on the end face. The plural positive electrode tabs 16 are electrically connected to a positive electrode-side lead 22 in a bundled state. A positive electrode terminal is structured from the positive electrode tabs 16 and the positive electrode-side lead 22. The negative electrode tabs 17 are electrically connected to a negative electrode-side lead 23 in a bundled state. A negative electrode terminal is structured from the negative electrode tabs 23 and the negative electrode-side lead 17. A sealing plate 10 made of metal is fixed to the opening of the metal container (container member 2) by welding or the like. The positive electrode-side lead 22 and the negative electrode-side lead 23 are extracted to the outside from outlets provided on the sealing plate 10, respectively. The inner surface of each outlet on the sealing plate 10 is coated with an insulating member to avoid a short circuit caused by contact of the sealing plate 10 to the positive electrode-side lead 22 and the negative electrode-side lead 23.

As shown in FIG. 2, the other ends of the negative electrode tabs 17 have a strip shape and are electrically connected to each of plural positions of the negative electrode 3 located on the upper end face of the electrode group 1. Although not illustrated, similarly, the other ends of the positive electrode tabs 16 have a strip shape and are electrically connected to each of plural positions of the positive electrode 5 located on the upper end face of the electrode group 1.

Referring to FIG. 1, the sealing plate 10 made of metal is fixed over the opening of the metal container (container member 2) by welding or the like. The positive electrode-side leads 22 and the negative electrode-side leads 23 are extracted to the outside from outlets provided on the sealing plate 10, respectively. On the inner surfaces of the outlets on the sealing plate 10, a positive electrode gasket 18 and a negative electrode gasket 19 are provided to avoid a short circuit caused by contact of the sealing plate 10 to the positive electrode-side leads 22 and the negative electrode-side leads 23. When the positive electrode gasket 18 and the negative electrode gaskets 19 are provided, the airtightness of the rectangular secondary battery 100 can be maintained.

A control valve 11 (safety valve) is provided on the sealing plate 10. If the internal pressure of the battery cell is raised by gas generated by electrolysis of the aqueous solvent, the generated gas can be released from the control valve 11 to the outside. As the control valve 11 there may be used, for example, a return type valve that operates when the internal pressure exceeds a predetermined value and functions as a sealing plug when the internal pressure lowers. Alternatively, there may be used a non-return type valve that cannot recover the function as a sealing plug once it operates. In FIG. 1, the control valve 11 is disposed at the center of the sealing plate 10. However, the position of the control valve 11 may be an end of the sealing plate 10. The control valve 11 may be omitted.

Additionally, a liquid pouring port 12 is provided on the sealing plate 10. The aqueous electrolyte may be poured in via the liquid pouring port 12. The liquid pouring port 12 may be closed with a sealing plug 13 after the aqueous electrolyte is poured in. The liquid pouring port 12 and the sealing plug 13 may be omitted.

FIG. 3 is a partially cut-out perspective view schematically showing another example of the secondary battery according to the first embodiment. FIG. 4 is an enlarged sectional view of section B of the secondary battery shown in FIG. 3. FIG. 3 and FIG. 4 show an example of the secondary battery 100 using a laminated film container member as a container.

The secondary battery 100 shown in FIGS. 3 and 4 includes an electrode group 1 shown in FIGS. 3 and 4, a container member 2 shown in FIG. 3, and an aqueous electrolyte, which is not shown. The electrode group 1 and the aqueous electrolyte are housed in the container member 2. The aqueous electrolyte is held in the electrode group 1.

The container member 2 is made of a laminated film including two resin layers and a metal layer sandwiched between the resin layers.

As shown in FIG. 4, the electrode group 1 is a stacked electrode group. The stacked electrode group 1 has a structure in which positive electrodes 3 and negative electrodes 5 are alternately stacked with separator(s) 4 sandwiched therebetween.

The electrode group 1 includes plural negative electrodes 3. Each of the negative electrodes 3 includes the negative electrode current collector 3a and the negative electrode active material-containing layers 3b supported on both surfaces of the negative electrode current collector 3a. The electrode group 1 further includes plural positive electrodes 5. Each of the positive electrodes 5 includes the positive electrode current collector 5a and the positive electrode active material-containing layers 5b supported on both surfaces of the positive electrode current collector 5a.

The negative electrode current collector 3a of each of the negative electrodes 3 includes at one end a portion where the negative electrode active material-containing layer 3b is not supported on any surface. This portion, that is, the negative electrode tab portion 3c serves as a negative electrode current collecting tab. As shown in FIG. 4, the negative electrode tab portion 3c does not overlap the positive electrode 5. Plural negative electrode tab portions 3c are electrically connected to a belt-shaped negative electrode terminal 6. A leading end of the belt-shaped negative electrode terminal 6 is drawn to the outside from the container member 2.

Although not shown, the positive electrode current collector 5a of each of the positive electrodes 5 includes at one end a portion where the positive electrode active material-containing layer 5b is not supported on any surface. This portion serves as a positive electrode current collecting tab. Like the negative electrode current collecting tab (negative electrode tab portion 3c), the positive electrode current collecting tab does not overlap the negative electrode 3. Further, the positive electrode current collecting tab is located on the opposite side of the electrode group 1 with respect to the negative electrode current collecting tab (negative electrode tab portion 3c). The positive electrode current collecting tab is electrically connected to a belt-shaped positive electrode terminal 7. A leading end of the belt-shaped positive electrode terminal 7 is located on the opposite side of the negative electrode terminal 6 and drawn to the outside from the container member 2.

FIG. 5 is a sectional view schematically showing yet another example of the secondary battery according to the embodiment;

The secondary battery 100 shown in FIG. 5 includes a negative electrode 3, a positive electrode 5, a separator 4, a first aqueous electrolyte 8, a second aqueous electrolyte 9, and a container member 2. The negative electrode 3 includes a negative electrode current collector 3a and a negative electrode active material-containing layer 3b provided on part of both surfaces of the negative electrode current collector 3a. The negative electrode current collector 3a includes a negative electrode tab portion 3c which is not covered with the negative electrode active material-containing layer 3b. The positive electrode 5 includes a positive electrode current collector 5a and a positive electrode active material-containing layer 5b provided on part of both surfaces of the positive electrode current collector 5a. The positive electrode current collector 5a includes a positive electrode tab portion 5c which is not covered with the positive electrode active material-containing layer 5b.

The negative electrode 3 is housed in the container member 2 in a state in which the negative electrode tab portion 3c projects outside. The positive electrode 5 is housed in the container member 2 in a state in which the positive electrode tab portion 5c projects outside. The first aqueous electrolyte 8 is housed in the container member 2 such that at least a portion thereof comes into contact with the negative electrode 3. The second aqueous electrolyte 9 is housed in the container member 2 such that at least a portion thereof comes into contact with the positive electrode 5.

In FIG. 5, as an example, an example in which a first aqueous electrolyte 8 contains a water-soluble organic solvent and a second aqueous electrolyte 9 does not contain a water-soluble organic solvent is shown. In addition, FIG. 5 shows a case where the first aqueous electrolyte 8 and the second aqueous electrolyte 9 are liquid.

As shown in FIG. 5, the separator 4 may extend from the inside to the outside of the container member 2, or may be provided within the container member 2. In this example, the separator 4 is an ion exchange membrane or a solid electrolyte.

The secondary battery according to the first embodiment includes the aqueous electrolyte described above. By using the aqueous electrolyte, electrolysis of water can be suppressed. Therefore, excellent charge and discharge performance and excellent cycle performance can be exhibited.

Second Embodiment

According to a second embodiment, a battery module is provided. The battery module includes plural of secondary batteries according to the first embodiment.

In the battery module according to the second embodiment, individual single-batteries may be arranged to be electrically connected in series or in parallel, or may be arranged in combination of in-series connection and in-parallel connection.

Next, an example of the battery module according to the second embodiment will be described with reference to the drawings.

Figure 6:
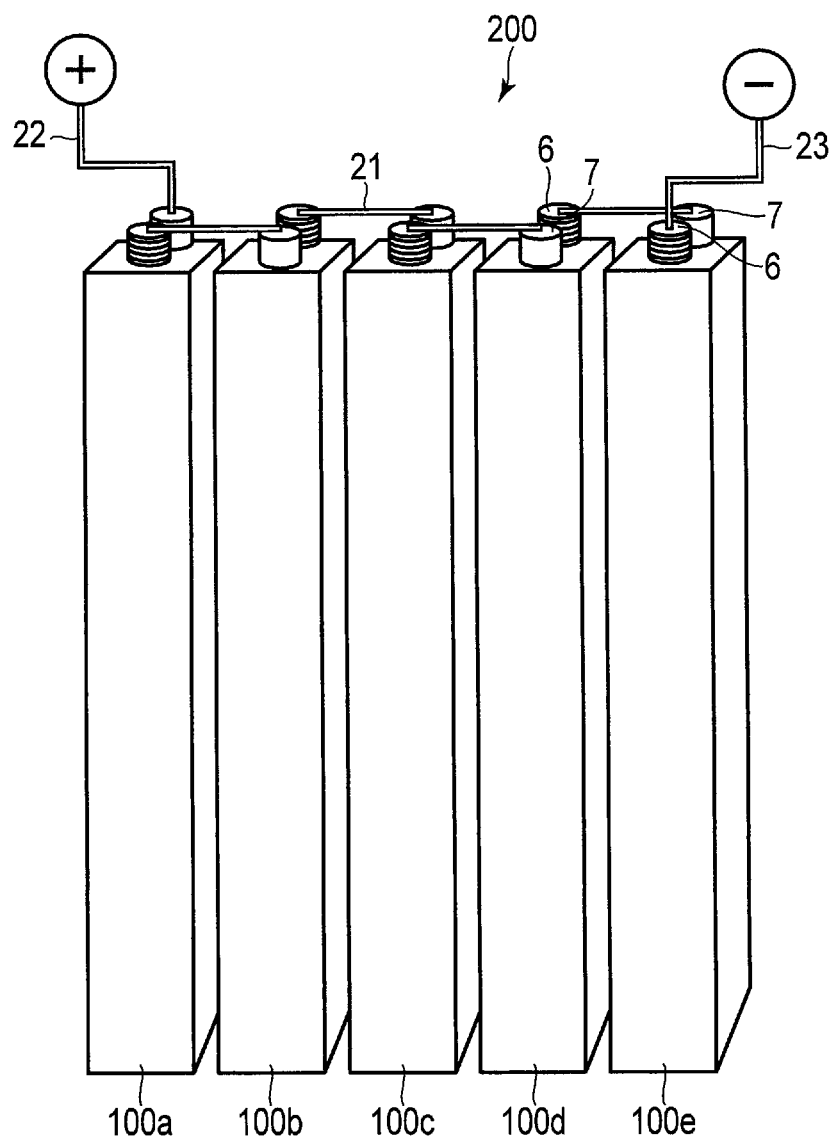
FIG. 6 is a perspective view schematically showing an example of the battery module according to a second embodiment.

FIG. 6 is a perspective view schematically showing an example of the battery module according to the second embodiment. The battery module 200 shown in FIG. 5 includes five single-batteries 100a to 100e, four bus bars 21, a positive electrode-side lead 22, and a negative electrode-side lead 23. Each of the five single-batteries 100a to 100e is the secondary battery according to the first embodiment.

The bus bar 21 connects, for example, a negative electrode terminal 6 of one single-battery 100a and a positive electrode terminal 7 of the single-battery 100b positioned adjacent to the single-battery 100a. In this way, the five single-batteries 100a to 100e are connected in series by the four bus bars 21. That is, the battery module 200 shown in FIG. 5 is a battery module of five in-series connection.

As shown in FIG. 6, the positive electrode terminal 7 of the single-battery 100a located at the left end among the five single-batteries 100a to 100e is connected to the positive electrode-side lead 22 for external connection. In addition, the negative electrode terminal 6 of the single-battery 100e located at the right end among the five single-batteries 100a to 100e is connected to the negative electrode-side lead 23 for external connection. The battery module according to the second embodiment includes a secondary battery according to the first embodiment. Therefore, the battery module according to the second embodiment can exhibit excellent charge and discharge performance and excellent cycle performance.

Third Embodiment

According to a third embodiment, a battery pack is provided. The battery pack includes the battery module according to the second embodiment. The battery pack may include a single secondary battery according to the first embodiment, in place of the battery module according to the second embodiment.

The battery pack according to the third embodiment may further include a protective circuit. The protective circuit has a function to control charging and discharging of the secondary battery. Alternatively, a circuit included in equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output current from the secondary battery, and to input external current into the secondary battery. In other words, when the battery pack is used as a power source, the current is provided out via the external power distribution terminal. When the battery pack is charged, the charging current (including regenerative energy of a motive force of vehicles such as automobiles) is provided to the battery pack via the external power distribution terminal.

Next, an example of a battery pack according to the third embodiment will be described with reference to the drawings.

Figure 8:
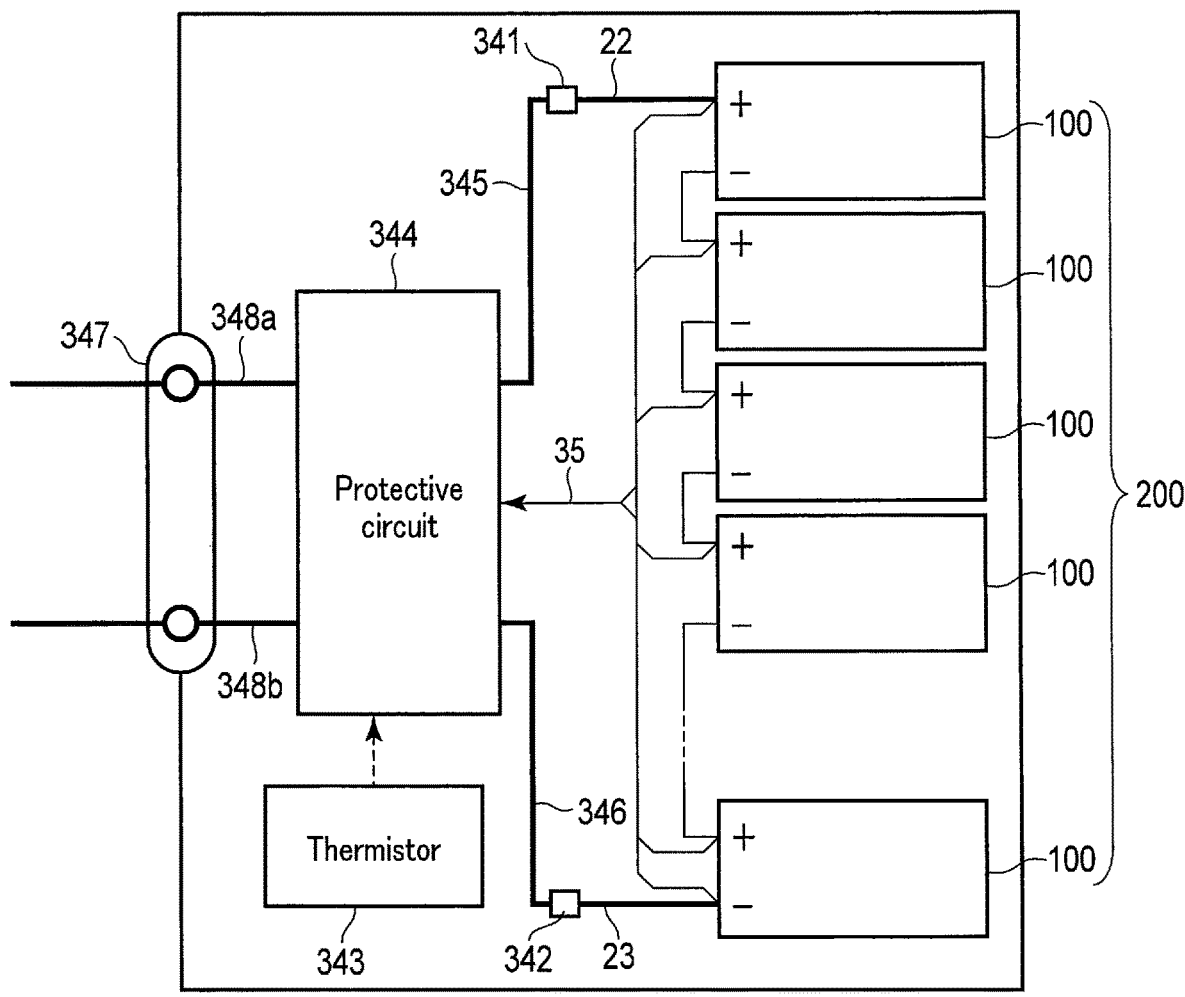
FIG. 8 is a block diagram showing an example of an electric circuit of the battery pack shown in FIG. 7.

FIG. 7 is an exploded perspective view schematically showing an example of the battery pack according to the third embodiment. FIG. 8 is a block diagram showing an example of an electric circuit of the battery pack shown in FIG. 7.

A battery pack 300 shown in FIGS. 7 and 8 includes a housing container 31, a lid 32, protective sheets 33, a battery module 200, a printed wiring board 34, wires 35, and an insulating plate (not shown).

A housing container 31 shown in FIG. 7 is a bottomed-square-shaped container having a rectangular bottom surface. The housing container 31 is configured to house the protective sheets 33, the battery module 200, the printed wiring board 34, and wires 35. The lid 32 has a rectangular shape. The lid 32 covers the housing container 31 to house the battery module 200 and the like. Although not shown, opening(s) or connection terminal(s) for connecting to external device(s) and the like are provided on the housing container 31 and lid 32.

The battery module 200 includes plural single-batteries 100, a positive electrode-side lead 22, a negative electrode-side lead 23, and adhesive tape(s) 24.

At least one of the plural single-batteries 100 is a secondary battery according to the first embodiment. The plural single-batteries 100 are stacked such that the negative electrode terminals 6 and the positive electrode terminals 7, which extend outside, are directed toward the same direction. The plural single-batteries 100 are electrically connected in series, as shown in FIG. 8. The plural single-batteries 100 may alternatively be electrically connected in parallel, or connected in a combination of in-series connection and in-parallel connection. If the plural single-batteries 100 are connected in parallel, the battery capacity increases as compared to a case in which they are connected in series.

The adhesive tape(s) 24 fastens the plural single-batteries 100. The plural single-batteries 100 may be fixed using a heat-shrinkable tape in place of the adhesive tape(s) 24. In this case, the protective sheets 33 are arranged on both side surfaces of the battery module 200, and the heat-shrinkable tape is wound around the battery module 200 and protective sheets 33. After that, the heat-shrinkable tape is shrunk by heating to bundle the plural single-batteries 100.

One end of the positive electrode-side lead 22 is connected to the positive electrode terminal 7 of the single-battery 100 located lowermost in the stack of the single-batteries 100. One end of the negative electrode-side lead 23 is connected to the negative electrode terminal 6 of the single-battery 100 located uppermost in the stack of the single-batteries 100.

The printed wiring board 34 is arranged on the inner surface of the housing container 31 along the short side direction. The printed wiring board 34 includes a positive electrode-side connector 341, a negative electrode-side connector 342, a thermistor 343, a protective circuit 344, wirings 345 and 346, an external power distribution terminal 347, a plus-side (positive-side) wire 348a, and a minus-side (negative-side) wire 348b. One principal surface of the printed wiring board 34 faces the surface of the battery module 200 from which the negative electrode terminals 6 and the positive electrode terminals 7 extend out. An insulating plate (not shown) is disposed in between the printed wiring board 34 and the battery module 200.

The positive electrode-side connector 341 is provided with a through hole. By inserting the other end of the positive electrode-side lead 22 into the though hole, the positive electrode-side connector 341 and the positive electrode-side lead 22 become electrically connected. The negative electrode-side connector 342 is provided with a through hole. By inserting the other end of the negative electrode-side lead 23 into the though hole, the negative electrode-side connector 342 and the negative electrode-side lead 23 become electrically connected.

The thermistor 343 is fixed to one principal surface of the printed wiring board 34. The thermistor 343 detects the temperature of each single-battery 100 and transmits detection signals to the protective circuit 344.

The external power distribution terminal 347 is fixed to the other principal surface of the printed wiring board 34. The external power distribution terminal 347 is electrically connected to device(s) that exists outside the battery pack 300.

The protective circuit 344 is fixed to the other principal surface of the printed wiring board 34. The protective circuit 344 is connected to the external power distribution terminal 347 via the plus-side wire 348a. The protective circuit 344 is connected to the external power distribution terminal 347 via the minus-side wire 348b. In addition, the protective circuit 344 is electrically connected to the positive electrode-side connector 341 via the wiring 345. The protective circuit 344 is electrically connected to the negative electrode-side connector 342 via the wiring 346. Furthermore, the protective circuit 344 is electrically connected to each of the plural single-batteries 100 via the wires 35.

The protective sheets 33 are arranged on both inner surfaces of the housing container 31 along the long side direction and on one inner surface of the housing container 31 along the short side direction facing the printed wiring board 34 through the battery module 200. The protective sheets 33 are made of, for example, resin or rubber.

The protective circuit 344 controls charge and discharge of the plural single-batteries 100. The protective circuit 344 is also configured to cut-off electric connection between the protective circuit 344 and the external power distribution terminal 347, based on detection signals transmitted from the thermistor 343 or detection signals transmitted from each single-battery 100 or the battery module 200.

An example of the detection signal transmitted from the thermistor 343 is a signal indicating that the temperature of a single-battery (or single-batteries) 100 is detected to be a predetermined temperature or more. An example of the detection signal transmitted from each single-battery 100 or the battery module 200 is a signal indicating detection of over-charge, over-discharge, and overcurrent of the single-battery (or single-batteries) 100. When detecting over-charge or the like for each of the single-batteries 100, the battery voltage may be detected, or a positive electrode potential or negative electrode potential may be detected. In the latter case, a lithium electrode to be used as a reference electrode may be inserted into each single-battery 100.

Note, that as the protective circuit 344, a circuit included in a device (for example, an electronic device or an automobile) that uses the battery pack 300 as a power source may be used.

As described above, the battery pack 300 includes the external power distribution terminal 347. Hence, the battery pack 300 can output current from the battery module 200 to an external device and input current from an external device to the battery module 200, via the external power distribution terminal 347. In other words, when using the battery pack 300 as a power source, the current from the battery module 200 is supplied to an external device via the external power distribution terminal 347. When charging the battery pack 300, a charge current from an external device is supplied to the battery pack 300 via the external power distribution terminal 347. If the battery pack 300 is used as an onboard battery, the regenerative energy of the motive force of a vehicle can be used as the charge current from the external device.

Note that the battery pack 300 may include plural battery modules 200. In this case, the plural battery modules 200 may be connected in series, in parallel, or connected in a combination of in-series connection and in-parallel connection. The printed wiring board 34 and the wires 35 may be omitted. In this case, the positive electrode-side lead 22 and the negative electrode-side lead 23 may be used as the external power distribution terminal.

Such a battery pack is used for, for example, an application having a demand of being excellent in cycle performance when a large current is extracted. More specifically, the battery pack is used as, for example, a power source for electronic devices, a stationary battery, or an onboard battery for various kinds of vehicles. An example of the electronic device is a digital camera. The battery pack is particularly favorably used as an onboard battery.

The battery pack according to the third embodiment includes the secondary battery according to the first embodiment or the battery module according to the second embodiment. Therefore, the battery pack can exhibit excellent charge and discharge performance and excellent cycle performance.

Fourth Embodiment

According to a fourth embodiment, a vehicle is provided. The vehicle includes the battery pack according to the third embodiment.

In a vehicle according to the fourth embodiment, the battery pack is configured, for example, to recover regenerative energy from motive force of the vehicle. The vehicle according to the fourth embodiment includes a mechanism (e.g., a regenerator) for converting kinetic energy of the vehicle into regenerative energy.

Examples of the vehicle according to the fourth embodiment include two- to four-wheeled hybrid electric automobiles, two- to four-wheeled electric automobiles, power assisted bicycles, and railway cars.

In the vehicle according to the fourth embodiment, the installing position of the battery pack is not particularly limited. For example, the battery pack may be installed in the engine compartment of the vehicle, in rear parts of the vehicle, or under seats.

The vehicle according to the fourth embodiment may be equipped with plural battery packs. In such a case, the battery packs may be electrically connected in series, in parallel, or in a combination of in series connection and in parallel connection.

Next, an example of the vehicle according to the fourth embodiment will be described with reference to the drawings.

Figure 9:
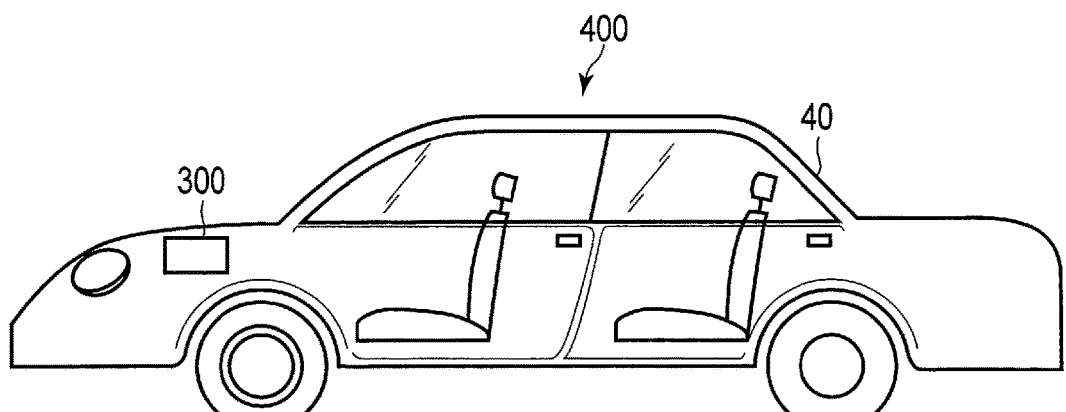
FIG. 9 is a sectional view schematically showing an example of the vehicle according to a fourth embodiment.

FIG. 9 is a sectional view schematically showing an example of a vehicle according to the fourth embodiment.

The vehicle 400 shown in FIG. 9 includes a vehicle body 40 and a battery pack 300 according to the third embodiment. The vehicle 400 shown in FIG. 9 is a four-wheeled automobile.

This vehicle 400 may have plural battery packs 300 installed. In such a case, the battery packs 300 may be connected in series, connected in parallel, or connected in a combination of in-series connection and in-parallel connection.

In FIG. 9, the battery pack 300 is installed in an engine compartment located at the front of the vehicle body 40. As described above, the battery pack 300 may be installed in rear sections of the vehicle body 40, or under a seat. The battery pack 300 may be used as a power source of the vehicle 400. In addition, the battery pack 300 can recover regenerative energy of a motive force of the vehicle 400.

The vehicle according to the fourth embodiment includes the battery pack according to the third embodiment. Therefore, since the battery pack can exhibit excellent charge and discharge performance, a vehicle with high performance can be provided. Furthermore, since the battery pack can exhibit excellent cycle performance, the vehicle has high reliability.

Fifth Embodiment

According to a fifth embodiment, a stationary power supply is provided. The stationary power supply includes a battery pack according to the third embodiment. Note that instead of a battery pack according to the third embodiment, the stationary power supply may have a battery module according to the second embodiment or a secondary battery according to the first embodiment installed therein.

The stationary power supply according to the fifth embodiment includes a battery pack according to the third embodiment. Therefore, the stationary power supply according to the fifth embodiment can exhibit excellent charge and discharge performance and excellent cycle performance.

FIG. 10 is a block diagram showing an example of a system including a stationary power supply according to the fifth embodiment. FIG. 10 is a diagram showing an application example to stationary power supplies 112, 123 as an example of use of battery packs 300A, 300B according to the third embodiment. In the example shown in FIG. 10, a system 110 in which the stationary power supplies 112, 123 are used is shown. The system 110 includes an electric power plant 111, the stationary power supply 112, a customer side electric power system 113, and an energy management system (EMS) 115. Also, an electric power network 116 and a communication network 117 are formed in the system 110, and the electric power plant 111, the stationary power supply 112, the customer side electric power system 113 and the EMS 115 are connected via the electric power network 116 and the communication network 117. The EMS 115 performs control to stabilize the entire system 110 by utilizing the electric power network 116 and the communication network 117.

The electric power plant 111 generates a large amount of electric power from fuel sources such as thermal power or nuclear power. Electric power is supplied from the electric power plant 111 through the electric power network 116 and the like. In addition, the battery pack 300A is installed in the stationary power supply 112. The battery pack 300A can store electric power and the like supplied from the electric power plant 111. In addition, the stationary power supply 112 can supply the electric power stored in the battery pack 300A through the electric power network 116 and the like. The system 110 is provided with an electric power converter 118. The electric power converter 118 includes a converter, an inverter, a transformer and the like. Thus, the electric power converter 118 can perform conversion between direct current (DC) and alternate current (AC), conversion between alternate currents of frequencies different from each other, voltage transformation (step-up and step-down) and the like. Therefore, the electric power converter 118 can convert electric power from the electric power plant 111 into electric power that can be stored in the battery pack 300A.

The customer side electric power system 113 includes an electric power system for factories, an electric power system for buildings, an electric power system for home use and the like. The customer side electric power system 113 includes a customer side EMS 121, an electric power converter 122, and the stationary power supply 123. The battery pack 300B is installed in the stationary power supply 123. The customer side EMS 121 performs control to stabilize the customer side electric power system 113. Electric power from the electric power plant 111 and electric power from the battery pack 300A are supplied to the customer side electric power system 113 through the electric power network 116. The battery pack 300B can store electric power supplied to the customer side electric power system 113. Similarly to the electric power converter 118, the electric power converter 122 includes a converter, an inverter, a transformer and the like. Thus, the electric power converter 122 can perform conversion between direct current and alternate current, conversion between alternate currents of frequencies different from each other, voltage transformation (step-up and step-down) and the like. Therefore, the electric power converter 122 can convert electric power supplied to the customer side electric power system 113 into electric power that can be stored in the battery pack 300B.

Note that the electric power stored in the battery pack 300B can be used, for example, for charging a vehicle such as an electric automobile. Also, the system 110 may be provided with a natural energy source. In such a case, the natural energy source generates electric power by natural energy such as wind power and solar light. In addition to the electric power plant 111, electric power is also supplied from the natural energy source through the electric power network 116.

EXAMPLES

Examples are explained below, but the embodiments are not limited to examples described below.

Example 1

<Production of Positive Electrode>

A positive electrode was produced as described below. 5.0 g of $LiMn_2O_4$ as positive electrode active material, 0.25 g of acetylene black as conductive agent, and 6.25 g of PVDF fluid dispersion (NMP solution whose solid content ratio is 8%) as binder (binder resin) were put into an ointment container made of plastic. The mixture was mixed for three minutes using a kneading machine (RENTARO ARV-310 manufactured by Thinky) to obtain a black viscous slurry. The slurry was applied to one side of Ti foil of 20 μm in thickness using an applicator of a gap thickness of 180 μm with Kapton (registered trademark owned by Du Pont) tape attached thereto. Then, on a hot plate at 120° C., the solvent was vaporized off to obtain a stacked laminate. Next, the stacked laminate was rolled with an initial load of 10 kN/cm$^2$ and a stretching rate of 0.5 mm/sec using a small roll press machine. Then, the stacked laminate was dried for 16 hours in a vacuum oven at 120° C. and then, punched out into a circular shape of 10 mm in diameter. The mass per unit area of the obtained positive electrode was 116 g/m$^2$.

<Production of Negative Electrode>

A negative electrode was produced as described below. 10.0 g of $Li_4Ti_5O_{12}$ as negative electrode active material, 1.0 g of graphite as conductive agent, and 1.0 g of PTFE fluid dispersion (solid content: 40% by weight) as binder (binder resin) and 8.0 g of NMP (N-methyl-2-pyrrolidone) were put into an ointment container made of plastic. The mixture was mixed for three minutes using a kneading machine (RENTARO ARV-310) to obtain a gray slurry. The slurry was applied to one side of Zn foil of 50 μm in thickness using an applicator whose gap thickness was 120 μm. Then, on a hot plate at 120° C., the solvent was vaporized off to obtain a stacked laminate. Next, the stacked laminate was rolled with an initial load of 14 kN/cm² and a stretching rate of 0.5 mm/sec using a small roll press machine. Then, the stacked laminate was dried for three hours in a vacuum oven at 120° C. and then, punched out into a circular shape of 10 mm in diameter. The mass per unit area of the obtained negative electrode was 35 g/m².

<Preparation of Electrolytic Solution>

300 mL of pure water was put into a 500 mL beaker into which a magnetic stirrer was put. When 254.3 g (6 mol) of lithium chloride was added here little by little while stirring the pure water, lithium chloride had dissolved completely accompanied with mild heat generation. The solution was transferred into a 500 mL messflask (graduated flask) and pure water was added up to the gauge line to obtain a lithium chloride solution of 12 mol/L. To 180 ml of this 12 mol/L lithium chloride solution were added 10.2 g (0.24 mol) of lithium chloride and 8.39 g (0.20 mol) of lithium hydroxide monohydrate, and a uniform solution was obtained by stirring well. The obtained solution and N-methyl-2-pyrrolidone were mixed at a volume ratio of 9:1 to obtain an electrolytic solution of Comparative Example 1. The electrolytic solution (first aqueous electrolyte) of Example 1 was obtained by adding 0.1 g of Compound A as the first compound to 9.9 g of the electrolytic solution of Comparative Example 1.

<Preparation of Test Batteries>

An aluminum plate subjected to anodic treatment was fixed onto a plastic plate, and a negative electrode was fixed onto the aluminum plate. A Ti plate was fixed onto another plastic plate, and a positive electrode was fixed on the Ti plate. The electrolytic solution prepared above was dropped onto the negative electrode, and a solid electrolyte membrane of LATP ($Li_{1.3}Al_{0.3}Ti_{1.7}(PO_4)_3$) was placed thereon and brought into close contact therewith. The amount of the electrolytic solution dropped onto the negative electrode was adjusted so that the amount of Compound A was 0.0025 g. A 12 mol/L aqueous solution of lithium chloride as the second aqueous electrolyte was dropped onto the reverse side of the same LATP membrane, and a positive electrode was placed thereon, brought into close contact therewith and further fixed with screws. In the test battery prepared as described above, the content of the first compound A relative to the zinc current collector was $9 \times 10^4$ ppm by weight. The content of the first compound A relative to the negative electrode active material (LTO) was $83 \times 10^4$ ppm by weight.

Example 2

A test battery was prepared in the same manner as described in Example 1, except that 0.1 g of Compound B was added instead of Compound A as the first compound.

Example 3

A test battery was prepared in the same manner as described in Example 1, except that 0.1 g of Compound C was added instead of Compound A as the first compound.

Example 5

A test battery was prepared in the same manner as described in Example 1, except that 0.1 g of Compound E was added instead of Compound A as the first compound.

Example 6

A test battery was prepared in the same manner as described in Example 1, except that 0.01 g of Compound E was added instead of Compound A as the first compound.

Example 7

A test battery was prepared in the same manner as described in Example 1, except that the added amount of Compound A as the first compound was changed to 0.02 g.

Example 8

A test battery was prepared in the same manner as described in Example 1, except that 0.1 g of Compound F was added instead of Compound A as the first compound.

Example 9

A test battery was prepared in the same manner as described in Example 1, except that 0.05 g of Compound F was added instead of Compound A as the first compound.

Comparative Example 1

A test battery was prepared in the same manner as described in Example 1, except that no first compound was added.

Comparative Example 2

A test battery was prepared in the same manner as described in Example 1, except that the added amount of Compound A as the first compound was changed to 0.01 g.

The details of the first compound used in each example and each comparative example are summarized in Table 4. Table 4 shows the added amount, HLB value, molecular formula, and molecular weight of the first compound. In Comparative Example 1, since the first compound was not added, the added amount, HLB value, molecular formula, and molecular weight of the first compound are not applicable and N/A is written therefor.

The molecular weight shown in Table 4 is the molecular weight determined by the method described above. Regarding subscripts n and m that indicate a stoichiometric ratio of respective alkylene oxide units within the oxyalkylene group in the molecular formula, the values based on the method described above are shown in Table 4.

TABLE 4

| | First compound | Added amount of first compound (wt %) | HLB value | Molecular formula | Molecular weight | n | m |
|---|---|---|---|---|---|---|---|
| Example 1 | A | 1 | 5 | $C_{12}H_{25}O[CH_2CH(CH_3)O]_m\cdot(CH_2CH_2O)_n]H$ | 2000 | 10 | 40 |
| Example 2 | B | 1 | 3 | $C_{12}H_{25}O[CH_2CH(CH_3)O]_m\cdot(CH_2CH_2O)_n]H$ | 500 | 1.4 | 8.4 |
| Example 3 | C | 1 | 5 | $C_{12}H_{25}O(CH_2CH_2O)_nH$ | 225 | 0.89 | N/A |
| Example 5 | E | 1 | 7.9 | $C_{12}H_{25}O(CH_2CH_2O)_nH$ | 278 | 2.1 | N/A |
| Example 6 | E | 0.1 | 7.9 | $C_{12}H_{25}O(CH_2CH_2O)_nH$ | 278 | 2.1 | N/A |
| Example 7 | A | 0.2 | 5 | $C_{12}H_{25}O[CH_2CH(CH_3)O]_m\cdot(CH_2CH_2O)_n]H$ | 2000 | 10 | 40 |
| Example 8 | F | 1 | 9.5 | $C_4H_9O(CH_2CH_2O)_n[CH_2CH(CH_3)O]_mH$ | 3238 | 35 | 28 |
| Example 9 | F | 0.5 | 9.5 | $C_4H_9O(CH_2CH_2O)_n[CH_2CH(CH_3)O]_mH$ | 3238 | 35 | 28 |
| Comparative Example 1 | None | N/A | N/A | N/A | N/A | N/A | N/A |
| Comparative Example 2 | A | 0.01 | 5 | $C_{12}H_{25}O[CH_2CH(CH_3)O]_m\cdot(CH_2CH_2O)_n]H$ | 2000 | 10 | 40 |

<Measurements of Interfacial Tension and Contact Angle the Electrolytic Solution>

For the electrolytic solution prepared in each example and each comparative example (aqueous electrolyte on the negative electrode side), the interfacial tension of the electrolytic solution was determined, as described above. The measurement was carried out five times and the average value thereof was calculated.

For each electrolytic solution, the contact angle on the zinc foil and the contact angle on the negative electrode were measured by the droplet method.

<Constant Current Charge and Discharge Test>

For each example and each comparative example, the test was promptly started without waiting time after the test battery was prepared. The test was performed at a 0.5 C rate for both the charge and discharge. When charged, the earliest among until the current value reached 0.25 C, until the charging time reached 132 minutes, and until the charging capacity reached 170 mAh/g was adopted as the termination condition. When discharged, after 132 minutes was adopted as the termination condition.

Assuming performing the charging once and performing the discharging once as one cycle of charging and discharging, charging and discharging was repeated 20 cycles. The charge capacity and the discharge capacity in each charge and discharge cycle were measured. The charge-discharge efficiency was calculated for each cycle according to Equation (2) from an obtained result:

$$\text{Charge-discharge efficiency (\%)} = \quad (2)$$
$$100 \times \{\text{discharge capacity (mAh/g)/charge capacity (mAh/g)}\}$$

However, for the test battery prepared in Comparative Example 1, though the charge and discharge could be performed in a stable manner up to the 6th cycle, the operation stopped thereafter. Thus, the test was interrupted at that time.

Table 5 summarizes measurement results of the prepared electrolytic solution and evaluation results of the prepared test battery for each example and each comparative example. Regarding the electrolytic solution, the interfacial tension, the contact angle on zinc foil, and the contact angle on the LTO negative electrode (negative electrode prepared as in Example 1) are shown. Regarding the evaluation results, the number of cycles that could be charged and discharged before the operation stopped, the cycle stability of charging and discharging, and the charge-discharge efficiency are shown. In Examples 1 to 3, 5, and 6, the operation did not stop even after the 34th charge and discharge cycle. Therefore, the number of cycles that can be charged and discharged is written as more than 34. Regarding cycle stability, the case of stable charging/discharging operation for 20 cycles or more is indicated by a circle (○), and the case where the operation stopped before that is indicated by crossing-out (x). As the charge-discharge efficiency, an average value from the first cycle to the twentieth cycle is shown. However, for the test battery whose operation stopped before the 20th cycle, the average value in the charge and discharge cycles that operated in a stable manner is shown.

TABLE 5

| | Interfacial tension (mN/m) | Contact angle on zinc foil (deg) | Contact angle on LTO negative electrode (deg) | Number of cycles able to be charged and discharged | Cycle stability | Charge-discharge efficiency (%) |
|---|---|---|---|---|---|---|
| Example 1 | 30 | 57.1 | 60.1 | >34 | ○ | 99.4 |
| Example 2 | 25.5 | 55.8 | 51.0 | >34 | ○ | 98.0 |
| Example 3 | 20.2 | 60.4 | 69.0 | >34 | ○ | 96.6 |
| Example 5 | 22.5 | 32.2 | 40.2 | >34 | ○ | 95.2 |
| Example 6 | 22.2 | 55 | 51.3 | >34 | ○ | 97.8 |
| Example 7 | 33.9 | 68.8 | 61.2 | >24 | ○ | 97.1 |
| Example 8 | 35.4 | 76.1 | 54.4 | >31 | ○ | 96.3 |
| Example 9 | 36.8 | 73.8 | 60.2 | >31 | ○ | 98.0 |
| Comparative Example 1 | 48 | 91 | 92.7 | 6 | x | 88.4 |

TABLE 5-continued

|  | Interfacial tension (mN/m) | Contact angle on zinc foil (deg) | Contact angle on LTO negative electrode (deg) | Number of cycles able to be charged and discharged | Cycle stability | Charge-discharge efficiency (%) |
|---|---|---|---|---|---|---|
| Comparative Example 2 | 42 | 81.9 | 89.4 | 2 | x | 69.3 |

Figure 11:
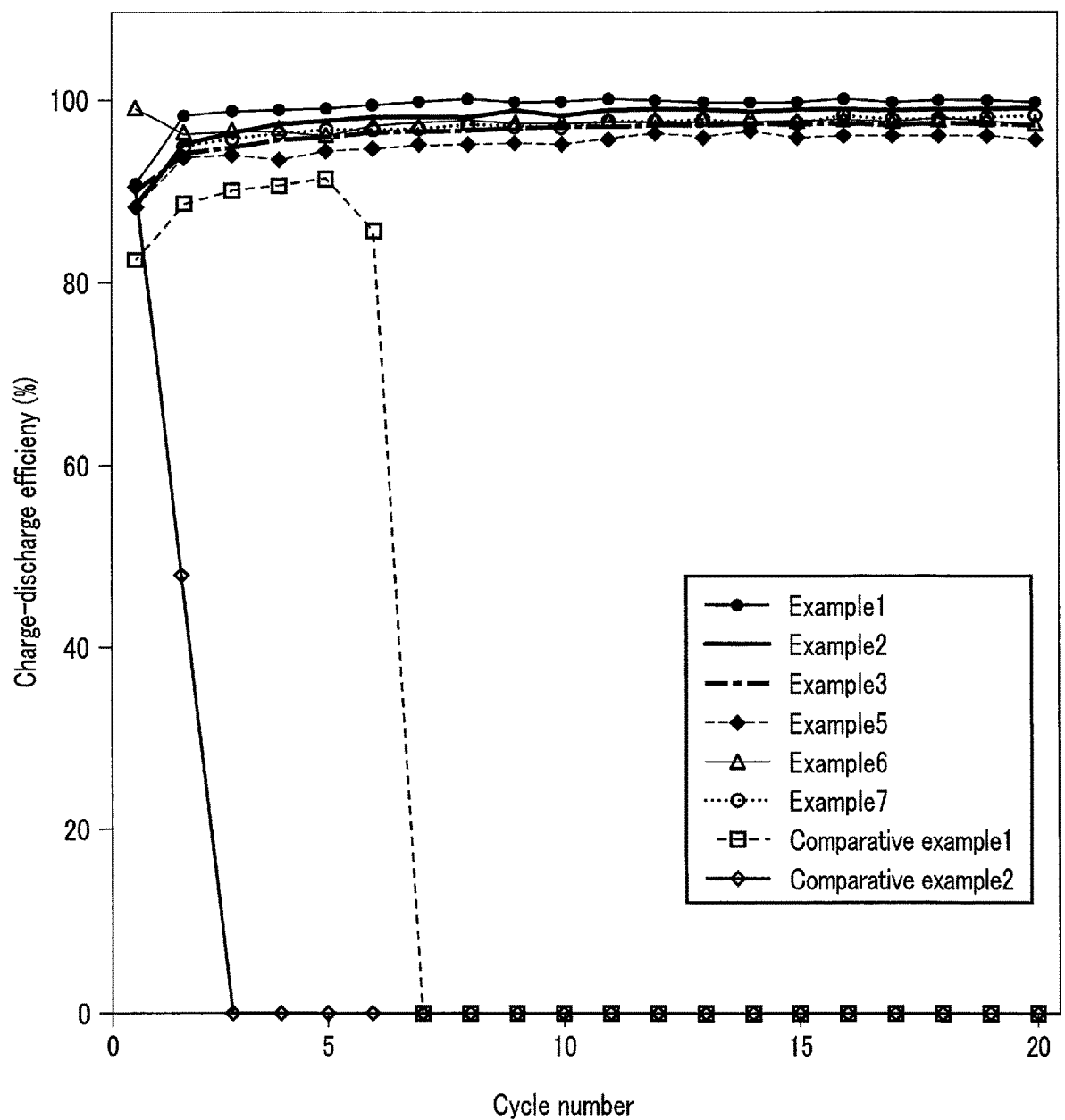
FIG. 11 is a graph showing results of charge-discharge efficiencies according to Examples and Comparative Examples.

Table 6 shows the values of charge-discharge efficiency in each cycle from the first cycle to the twentieth cycle for each example and each comparative example. FIG. 11 shows the contents of Table 6 as a graph. In the graph of FIG. 11, the charge-discharge efficiency according to each example and each of Comparative Examples 1 and 2 is shown by setting the cycle number as the horizontal axis and the charge-discharge efficiency as the vertical axis.

TABLE 6

Charge-discharge efficiency (%)

| Cycle number | Example 1 | Example 2 | Example 3 | Example 5 | Example 6 | Example 7 | Example 8 | Example 9 | Comparative Example 1 | Comparative Example 2 |
|---|---|---|---|---|---|---|---|---|---|---|
| 1 | 91.06 | 88.3 | 90.36 | 88.49 | 99.22 | 91.10 | 90.48 | 90.27 | 82.68 | 90.6 |
| 2 | 98.49 | 95.43 | 94.37 | 93.92 | 96.54 | 95.10 | 95.58 | 97.14 | 88.82 | 48 |
| 3 | 98.95 | 96.62 | 95 | 94.18 | 96.78 | 96.10 | 96.16 | 97.44 | 90.33 | N/A |
| 4 | 99.14 | 97.56 | 95.87 | 93.67 | 96.86 | 96.50 | 96.36 | 97.87 | 90.86 | N/A |
| 5 | 99.22 | 97.91 | 96.22 | 94.61 | 96.30 | 96.90 | 96.50 | 97.88 | 91.65 | N/A |
| 6 | 99.69 | 98.25 | 96.54 | 94.89 | 97.40 | 97.00 | 96.78 | 98.18 | 85.87 | N/A |
| 7 | 99.95 | 98.33 | 96.8 | 95.24 | 97.75 | 97.10 | 96.70 | 98.21 | N/A | N/A |
| 8 | 100.26 | 98.24 | 96.86 | 95.48 | 97.96 | 97.50 | 96.59 | 98.44 | N/A | N/A |
| 9 | 99.95 | 98.98 | 97.05 | 95.43 | 97.57 | 97.30 | 96.43 | 98.45 | N/A | N/A |
| 10 | 100.09 | 98.5 | 97.16 | 95.42 | 97.71 | 97.10 | 96.51 | 98.68 | N/A | N/A |
| 11 | 100.27 | 99.07 | 97.13 | 95.86 | 98.06 | 97.80 | 96.22 | 98.81 | N/A | N/A |
| 12 | 100.18 | 99.19 | 97.31 | 96.42 | 98.64 | 97.80 | 96.94 | 98.89 | N/A | N/A |
| 13 | 99.88 | 99.14 | 97.39 | 96.13 | 98.22 | 98.20 | 96.01 | 98.68 | N/A | N/A |
| 14 | 99.95 | 99.03 | 97.6 | 96.77 | 98.86 | 97.80 | 96.79 | 98.67 | N/A | N/A |
| 15 | 100.04 | 99.12 | 97.5 | 96.13 | 98.18 | 97.80 | 96.56 | 98.66 | N/A | N/A |
| 16 | 100.34 | 99.18 | 97.67 | 96.31 | 98.24 | 98.50 | 96.94 | 98.79 | N/A | N/A |
| 17 | 100.01 | 99.05 | 97.66 | 96.18 | 97.80 | 97.90 | 97.05 | 98.67 | N/A | N/A |
| 18 | 100.22 | 99.18 | 97.63 | 96.34 | 98.22 | 98.30 | 96.96 | 98.73 | N/A | N/A |
| 19 | 100.12 | 99.17 | 97.6 | 96.29 | 97.84 | 98.30 | 96.63 | 98.73 | N/A | N/A |
| 20 | 100.05 | 99.26 | 97.77 | 95.93 | 97.39 | 98.50 | 97.30 | 98.78 | N/A | N/A |
| Average | 99.4 | 98.0 | 96.6 | 95.2 | 97.8 | 97.1 | 96.3 | 98.0 | 88.4 | 69.3 |

As is apparent from Tables 5 and 6, in Examples 1 to 3 and 5 to 7 in which the interfacial tension of the aqueous electrolyte was 34 mN/m or less, the cycle performance and charge-discharge efficiency were excellent. From these results, it can be inferred that in each example, an electrolysis reaction of water was suppressed and insertion and extraction of carriers (lithium ions) into and from the negative electrode active material was efficiently performed.

In Examples 8 and 9 also, the interfacial tension of the aqueous electrolyte was 37 mN/m or less. In these examples also, the cycle performance and charge-discharge efficiency were excellent, and it can be seen that the same effect as those in Examples 1 to 3 and 5 to 7 was obtained.

On the other hand, in Comparative Example 1, after 6 cycles of charging and discharging, the operation stopped and cycle stability was low. In Comparative Example 2, after 2 cycles of charging and discharging, the operation stopped and cycle stability was low. This is presumed to be due to an occurrence of electrolysis reaction of water in the electrolytic solution and the generation of hydrogen or the like, which made charging and discharging not performable. Also, the charge-discharge efficiency was low. This is presumed to be due to competition between the electrolysis reaction of water and an insertion/desorption reaction of carriers into/from the negative electrode active material.

According to at least one embodiment and at least one example described above, there is provided a secondary battery including a positive electrode, a negative electrode, and an aqueous electrolyte. The negative electrode contains a titanium-containing oxide. The aqueous electrolyte contains a solvent and alkali metal ions or alkaline earth metal ions, the solvent containing water and a water-soluble organic solvent, where an interfacial tension of the aqueous electrolyte is 37 mN/m or less. With such a configuration, the secondary battery can exhibit excellent charge and discharge performance and excellent cycle performance.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A secondary battery comprising:
   a positive electrode;
   a negative electrode comprising a titanium-containing oxide; and an aqueous electrolyte comprising a solvent and alkali metal ions or alkaline earth metal ions, the solvent comprising water and a water-soluble organic solvent, and an interfacial tension of the aqueous electrolyte being 37 mN/m or less.

2. The secondary battery according to claim 1, wherein the interfacial tension of the aqueous electrolyte is 34 mN/m or less.

3. The secondary battery according to claim 1, wherein the aqueous electrolyte further comprises a first compound, the first compound comprising an organic compound, the organic compound comprising a hydrophilic portion and a hydrophobic portion.

4. The secondary battery according to claim 3, wherein the organic compound is a nonionic surfactant.

5. The secondary battery according to claim 4, wherein the nonionic surfactant comprises one or more surfactant selected from a group consisting of polyoxyethylene alkyl ether and polyoxyalkylene alkyl ether.

6. The secondary battery according to claim 4, wherein the nonionic surfactant has a molecular weight within a range of from 200 to 4000.

7. The secondary battery according to claim 1, wherein the aqueous electrolyte is a first aqueous electrolyte in contact with the negative electrode.

8. The secondary battery according to claim 7, wherein pH of the first aqueous electrolyte is 7 or more.

9. The secondary battery according to claim 1, wherein the water-soluble organic solvent includes at least one solvent selected from a group consisting of N-methyl-2-pyrrolidone, methanol, ethanol, propanol, isopropanol, butanol, isobutyl alcohol, sec-butyl alcohol, tert-butanol, ethylene glycol, 1,2-dimethoxyethane, tetrahydrofuran, 1,4-dioxane, acetone, ethyl methyl ketone, acetonitrile, dimethylformamide, hexamethylphosphoric triamide, triethylamine, pyridine, and dimethyl sulfoxide.

10. The secondary battery according to claim 1, wherein the negative electrode further comprises zinc.

11. The secondary battery according to claim 1, wherein the negative electrode further comprises a negative electrode current collector comprising zinc.

12. A battery pack comprising the secondary battery according to claim 1.

13. The battery pack according to claim 12, further comprising an external power distribution terminal and a protective circuit.

14. The battery pack according to claim 12, further comprising plural of the secondary battery,
wherein the secondary batteries are electrically connected in series, in parallel, or in combination of in-series connection and in-parallel connection.

15. A vehicle comprising the battery pack according to claim 12.

16. The vehicle according to claim 15, which comprises a mechanism configured to convert kinetic energy of the vehicle into regenerative energy.

17. A stationary power supply comprising the battery pack according to claim 12.

* * * * *